(12) United States Patent
Nakayama

(10) Patent No.: US 6,934,092 B1
(45) Date of Patent: Aug. 23, 2005

(54) ZOOM LENS AND PHOTOGRAPHING APPARATUS HAVING THE SAME

(75) Inventor: Hiroki Nakayama, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 09/660,502

(22) Filed: Sep. 12, 2000

Related U.S. Application Data

(62) Division of application No. 09/248,979, filed on Feb. 12, 1999, now Pat. No. 6,154,322.

(30) Foreign Application Priority Data

| Feb. 19, 1998 | (JP) | ............ 10-054434 |
|---|---|---|
| Jan. 20, 1999 | (JP) | ............ 11-011288 |

(51) Int. Cl.$^7$ ............................................. G02B 15/14
(52) U.S. Cl. ........................ 359/691; 359/686; 359/680
(58) Field of Search ................................. 359/691, 686, 359/689, 680, 681, 682

(56) References Cited

U.S. PATENT DOCUMENTS

| 4,299,452 | A | | 11/1981 | Ikemori ..................... 359/681 |
|---|---|---|---|---|
| 4,367,927 | A | | 1/1983 | Fujii ......................... 350/426 |
| 4,370,031 | A | | 1/1983 | Ikemori ..................... 359/681 |
| 4,659,189 | A | | 4/1987 | Kitagishi .................... 359/681 |
| 4,776,679 | A | | 10/1988 | Kitagishi et al. ........... 359/686 |
| 4,810,070 | A | | 3/1989 | Suda et al. ................. 359/653 |
| 4,842,386 | A | | 6/1989 | Kitagishi et al. ........... 359/681 |
| 4,907,866 | A | | 3/1990 | Kitagishi et al. ........... 359/654 |
| 4,993,814 | A | * | 2/1991 | Hata .......................... 359/691 |
| 4,999,007 | A | | 3/1991 | Aoki et al. ................. 359/676 |
| 5,011,272 | A | | 4/1991 | Nakayama et al. ......... 359/692 |
| 5,078,481 | A | | 1/1992 | Nakayama et al. ......... 359/680 |
| 5,087,988 | A | | 2/1992 | Nakayama ................. 359/689 |
| 5,111,338 | A | | 5/1992 | Nakayama ................. 359/686 |
| 5,113,287 | A | | 5/1992 | Nakayama ................. 359/676 |
| 5,155,629 | A | * | 10/1992 | Ito et al. .................... 359/676 |
| 5,283,693 | A | | 2/1994 | Kohno et al. .............. 359/691 |
| 5,331,464 | A | | 7/1994 | Ito et al. .................... 359/691 |
| 5,583,699 | A | | 12/1996 | Nakayama ................. 359/687 |
| 5,691,851 | A | | 11/1997 | Nishio et al. .............. 359/683 |
| 5,710,669 | A | | 1/1998 | Endo ......................... 359/686 |
| 5,724,195 | A | * | 3/1998 | Enomoto et al. .......... 359/752 |
| 5,739,961 | A | | 4/1998 | Nakayama et al. ........ 359/687 |
| 5,754,346 | A | | 5/1998 | Nakayama et al. ........ 359/687 |
| 5,847,882 | A | | 12/1998 | Nakayama ................. 359/684 |
| 5,978,154 | A | | 11/1999 | Hashimura ................. 359/691 |
| 6,014,268 | A | * | 1/2000 | Yahagi ....................... 359/691 |
| 6,081,389 | A | | 6/2000 | Takayama et al. ......... 359/680 |
| 6,104,548 | A | * | 8/2000 | Nakayama et al. ........ 359/690 |
| 6,154,322 | A | * | 11/2000 | Nakayama ................. 359/691 |
| 6,236,522 | B1 | * | 5/2001 | Shimizu ..................... 359/773 |

FOREIGN PATENT DOCUMENTS

| JP | 53-132360 | 11/1978 |
|---|---|---|
| JP | 56-19022 | 2/1981 |
| JP | 60-55311 | 3/1985 |
| JP | 60-46688 | 10/1985 |
| JP | 61-42246 | 9/1986 |

(Continued)

*Primary Examiner*—Timothy Thompson
(74) *Attorney, Agent, or Firm*—Fitzpatrick, Cella, Harper & Scinto

(57) ABSTRACT

A zoom lens of the negative lead type includes comprises, in order from an object side, a first lens unit of negative refractive power and a second lens unit of positive refractive power, variation of magnification being effected by varying a separation between the first lens unit and the second lens unit, the zoom lens satisfying the following conditions:

$$3 \leq NL1 \leq 4$$

$$NL2 \leq NL1$$

where NL1 and NL2 are numbers of lens elements which constitute the first lens unit and the second lens unit, respectively.

17 Claims, 15 Drawing Sheets

FOREIGN PATENT DOCUMENTS

| | | |
|---|---|---|
| JP | 2-136812 | 5/1990 |
| JP | 4-46308 | 2/1992 |
| JP | 4-46309 | 2/1992 |
| JP | 4-46310 | 2/1992 |
| JP | 4-56814 | 2/1992 |
| JP | 4-67112 | 3/1992 |
| JP | 4-67113 | 3/1992 |
| JP | 4-114115 | 4/1992 |
| JP | 4-304410 | 10/1992 |
| JP | 5-88084 | 4/1993 |
| JP | 7-333503 | 12/1995 |
| JP | 8-50245 | 2/1996 |
| JP | 8-86964 | 4/1996 |
| JP | 8-101340 | 4/1996 |
| JP | 8-106048 | 4/1996 |
| JP | 9-33810 | 2/1997 |
| JP | 9-311273 | 12/1997 |
| JP | 10-3037 | 1/1998 |

* cited by examiner

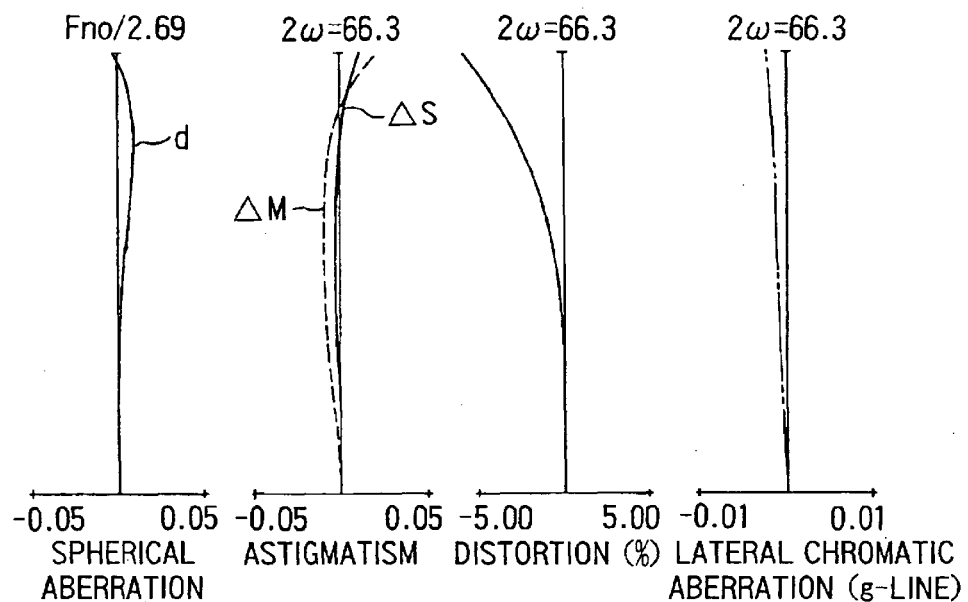
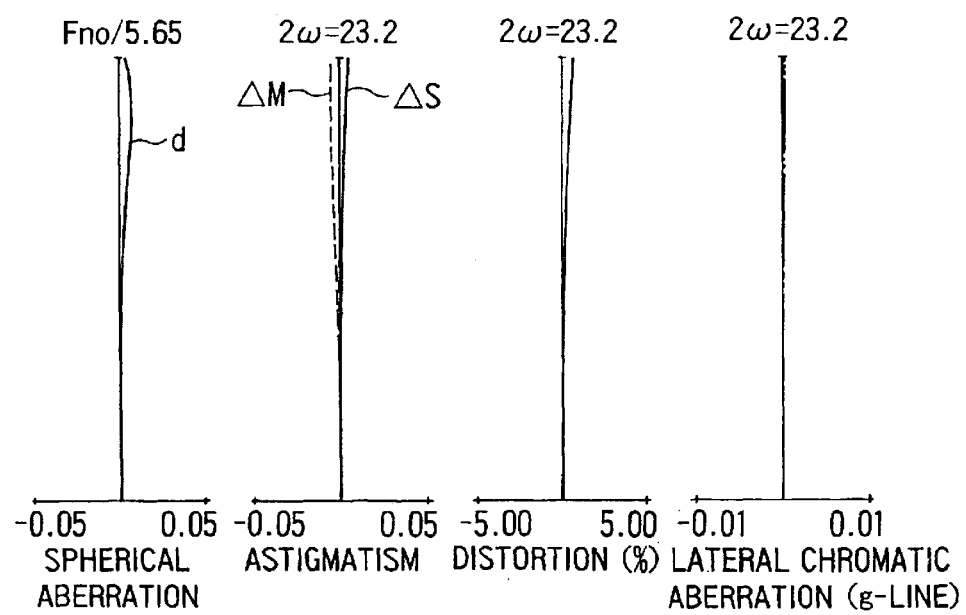

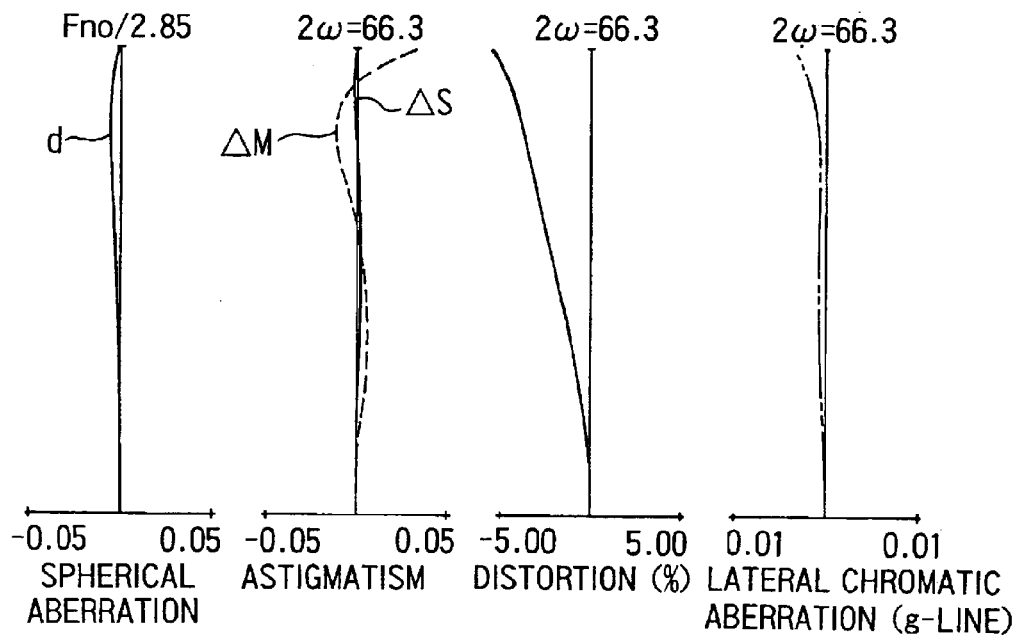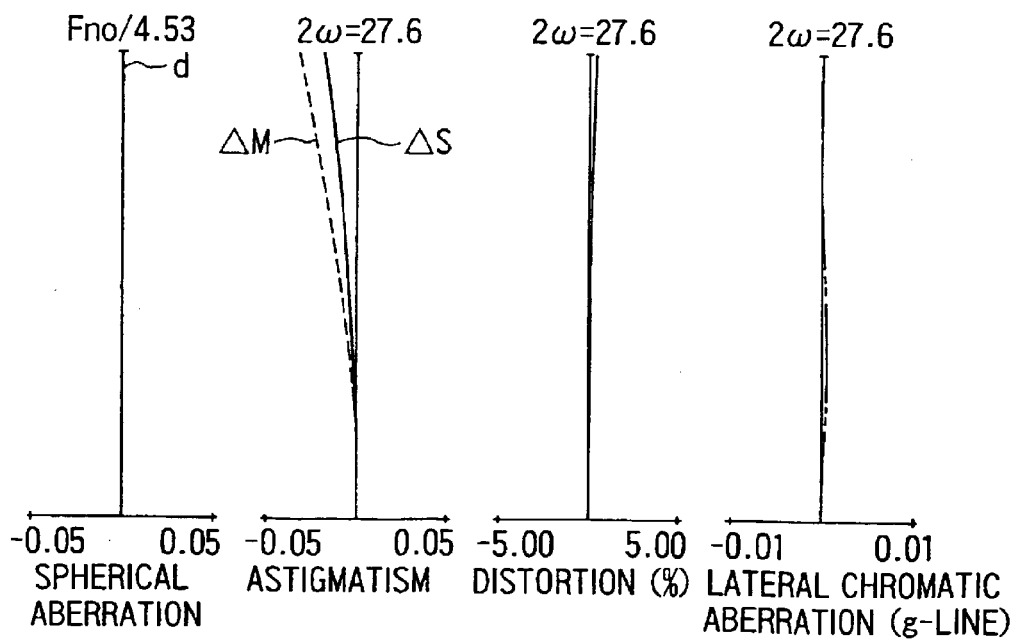

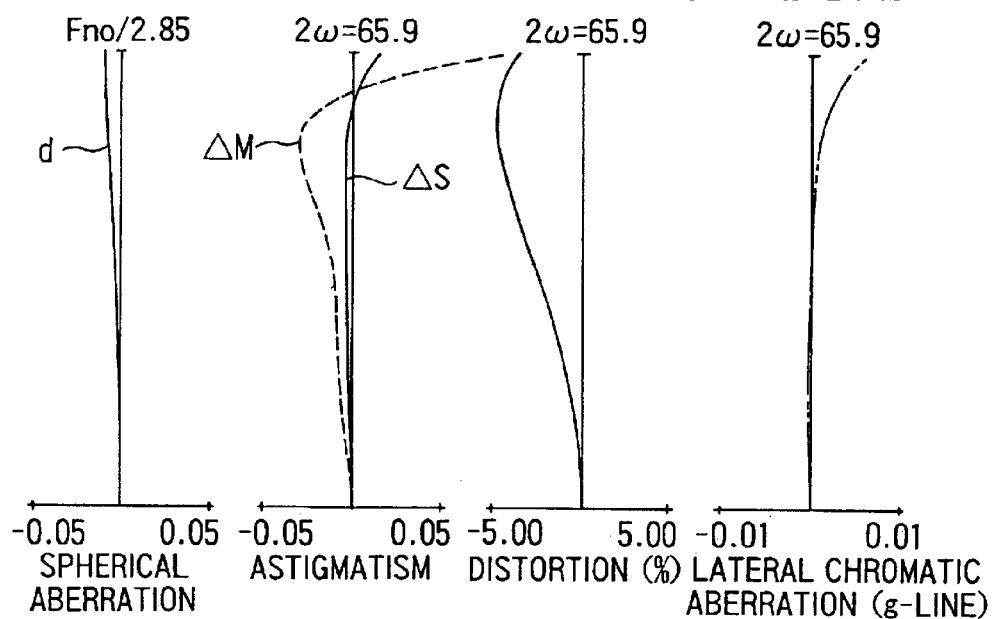
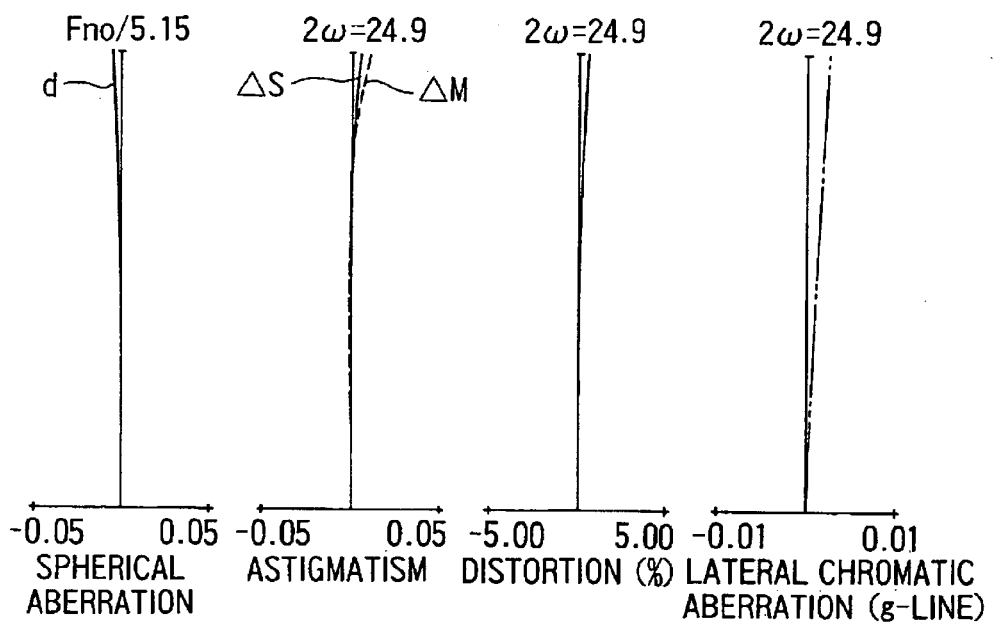

ZOOM LENS AND PHOTOGRAPHING APPARATUS HAVING THE SAME

This application is a division of application Ser. No. 09/248,979 filed Feb. 12, 1999 now U.S. Pat. No. 6,154,322.

BACKGROUND OF THE INVENTION

1. Field of the Invention

The present invention relates to zoom lenses suited to cameras for photography, video cameras and still video cameras.

2. Description of Related Art

A type of zoom lens in which the preceding lens unit is negative in refractive power, or the so-called negative lead type, is feasible for widening the angle of view with relative ease, so that the negative lead type zoom lens has found its use as the standard zoom lens in many cameras.

Of the standard lenses of the above type, there is a one which is constructed with a first lens unit of negative refractive power and a second lens unit of positive refractive power, totaling two lens units, the arrangement being made such that these two lens units move along a common optical axis in differential relation to vary the focal length, or the so-called 2-unit zoom lens, as, for example, proposed in Japanese Laid-Open Patent Applications No. Sho 53-132360 (corresponding to U.S. Pat. No. 4,299,452), No. Sho 56-19022 (corresponding to U.S. Pat. No. 4,370,031) and U.S. Pat. No 5,283,693.

For such 2-unit zoom lenses, the use of many aspheric surfaces reduces the number of constituent lenses to a compact form, as, for example, proposed in Japanese Laid-Open Patent Applications No. Hei 4-46308, No. Hei 4-46309, No. Hei 4-46310, No. Hei 4-56814, No. Hei 4-67112, No. Hei 4-67113 and No. Hei 9-33810.

Also, in Japanese Patent Publication No. Sho 60-46688 and Japanese Laid-Open Patent Application No. Hei 5-88084, a compact zoom lens is disclosed, in which the first lens unit is constructed with a negative lens and a positive lens, totaling two lenses, and the second lens unit is constructed with a positive lens, a positive lens, a negative lens and a positive lens, totaling four lenses. In Japanese Patent Publication No. Sho 61-42246, the first lens unit is constructed with a negative lens and a positive lens, totaling two lenses, and the second lens unit is constructed with four or five lenses.

In general, the negative lead type zoom lens comprising the first lens unit of negative refractive power and the second lens unit of positive refractive power not only has the advantage that the maximum field angle is relatively easy to increase, but also the advantage that a certain back focal distance is easy to obtain.

However, to simultaneously fulfill the requirements of making the entire lens system from as few lens elements as 4 to 8 and of obtaining a good optical performance, there is a need to appropriately determine the refractive power arrangement of all the lens elements in each unit, the forms of the lens elements and others. If these are inappropriate, the aberrations, during zooming, vary to a large extent, which cannot be remedied even if the number of lens elements is increased. Therefore, it becomes difficult to attain good stability of high optical performance throughout the entire zooming range.

For example, the zoom lens proposed in the above Japanese Laid-Open Patent Application No. Hei 9-33810, although its having a few lens elements, employs many aspheric surfaces. For this reason, the manufacturing tolerances become very severe. So, there is a difficult problem of axially aligning all the lens elements with high accuracy.

Even in another Patent, U.S. Pat. No. 4,999,007, a zoom lens with a smaller number of lens elements is proposed. Particularly for the first and second embodiments in this patent, a range of not less than 3 is realized, but the number of constituent lenses in the first lens unit is as few as 1 or 2. Accordingly, the aberrations the first lens unit produces, including chromatic aberrations, are not corrected well enough. Also, the aspherical first lens of the first embodiment has so unfavorable a form as to lessen the ease with which molding techniques are used. Concretely speaking, the paraxial and marginal zones largely differ in thickness. Therefore, as it takes form in the mold, the lens is hardly detached from the mold. In the second embodiment, the above-described drawback is small, but the angle of view is narrow, suggesting that the design does not aim at extending the wide angle end toward sufficiently shorter focal lengths. In addition, the entire lens system has a long total length and is not suited to improve the compactness of the camera.

BRIEF SUMMARY OF THE INVENTION

The present invention is designed to employ the negative-lead-type of zoom lens and sets forth proper rules of design for the form, the construction, and the arrangement of the constituent lenses in each lens unit. It is, therefore, an object of the invention to provide a zoom lens which is simplified in design, while still permitting the optical performance to be maintained stable at a high level throughout the entire zooming range and at a high quality over all the area of the image frame.

To attain the above object, in accordance with an aspect of the invention, there is provided a zoom lens, which comprises, in order from an object side, a first lens unit of negative refractive power and a second lens unit of positive refractive power, wherein a variation of magnification is effected by varying the separation between the first lens unit and the second lens unit, the zoom lens satisfying the following conditions:

$$3 \leq NL1 \leq 4 \tag{1}$$

$$NL2 \leq NL1 \tag{2}$$

where $NL1$ and $NL2$ are numbers of lens elements which constitute the first lens unit and the second lens unit, respectively.

BRIEF DESCRIPTION OF THE SEVERAL VIEWS OF THE DRAWING

FIGS. 10A to 10D are graphic representations of the various aberrations of the numerical example 1 at the wide-angle end.

FIGS. 11A to 11D are graphic representations of the various aberrations of the numerical example 1 at the telephoto end.

FIGS. 14A to 14D are graphic representations of the various aberrations of the numerical example 3 at the wide-angle end.

FIGS. 15A to 15D are graphic representations of the various aberrations of the numerical example 3 at the telephoto end.

FIGS. 24A to 24D are graphic representations of the various aberrations of the numerical example 8 at the wide-angle end.

FIGS. 25A to 25D are graphic representations of the various aberrations of the numerical example 8 at the telephoto end.

DETAILED DESCRIPTION OF THE INVENTION

Figure 1:
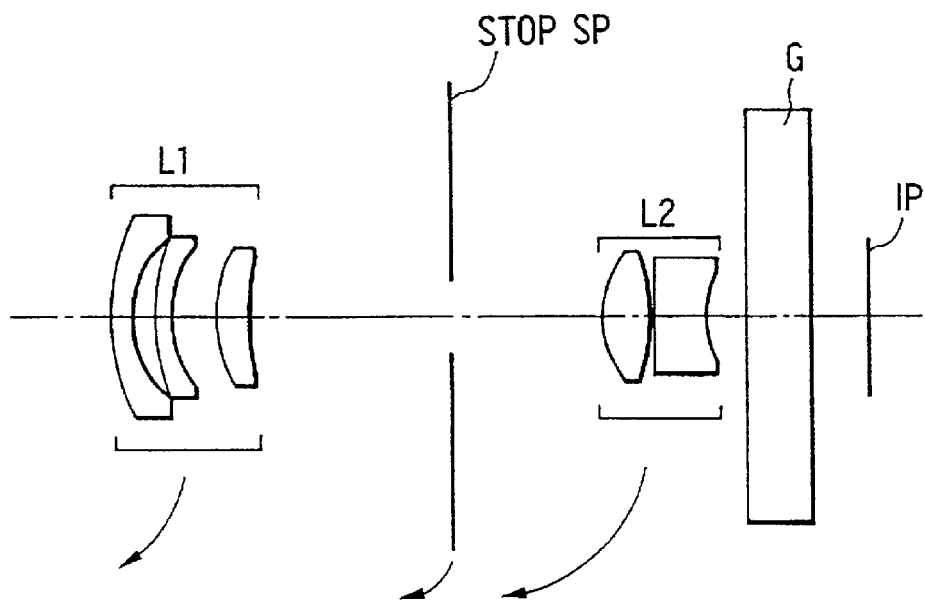
FIG. 1 is a longitudinal section view of a numerical example 1 of the zoom lens at the wide-angle end.
Figure 2:
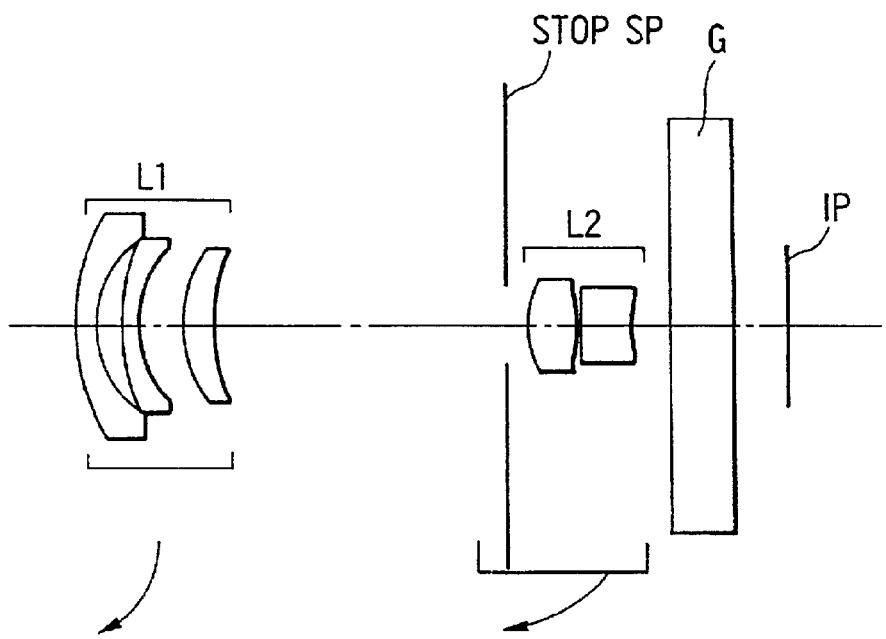
FIG. 2 is a longitudinal section view of a numerical example 2 of the zoom lens at the wide-angle end.
Figure 3:
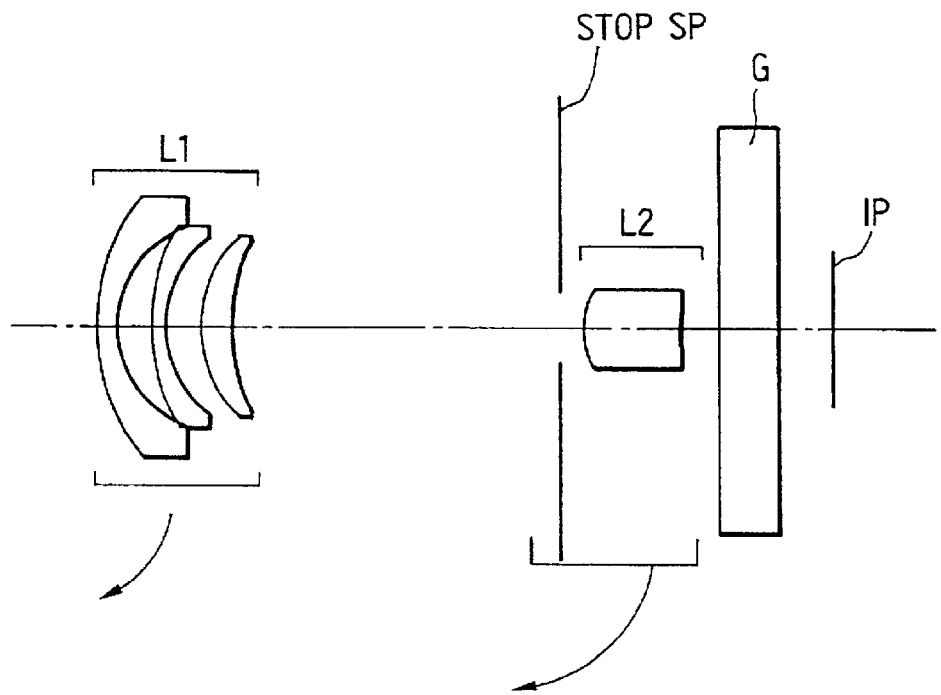
FIG. 3 is a longitudinal section view of a numerical example 3 of the zoom lens at the wide-angle end.
Figure 4:
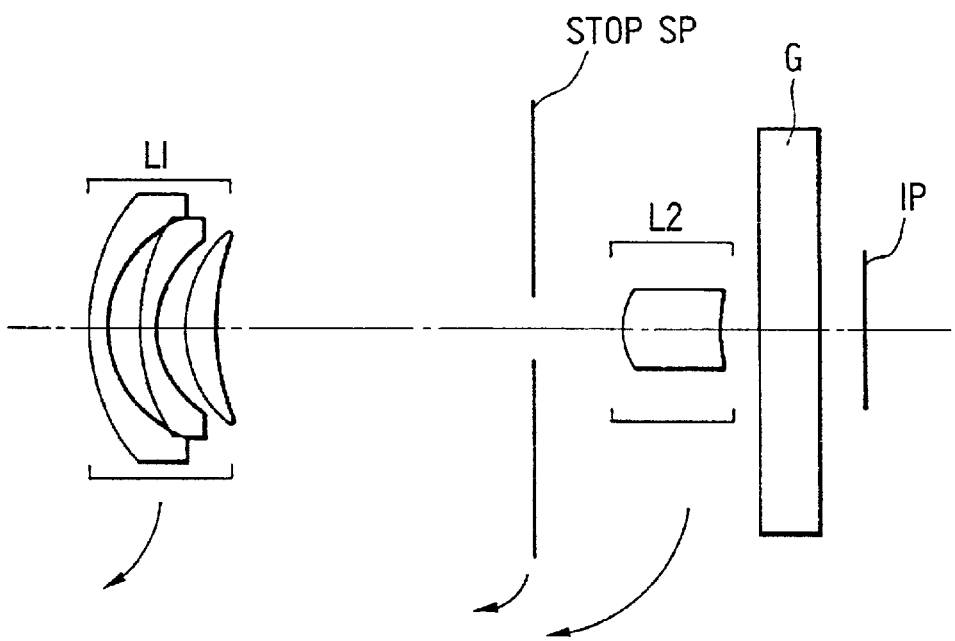
FIG. 4 is a longitudinal section view of a numerical example 4 of the zoom lens at the wide-angle end.
Figure 5:
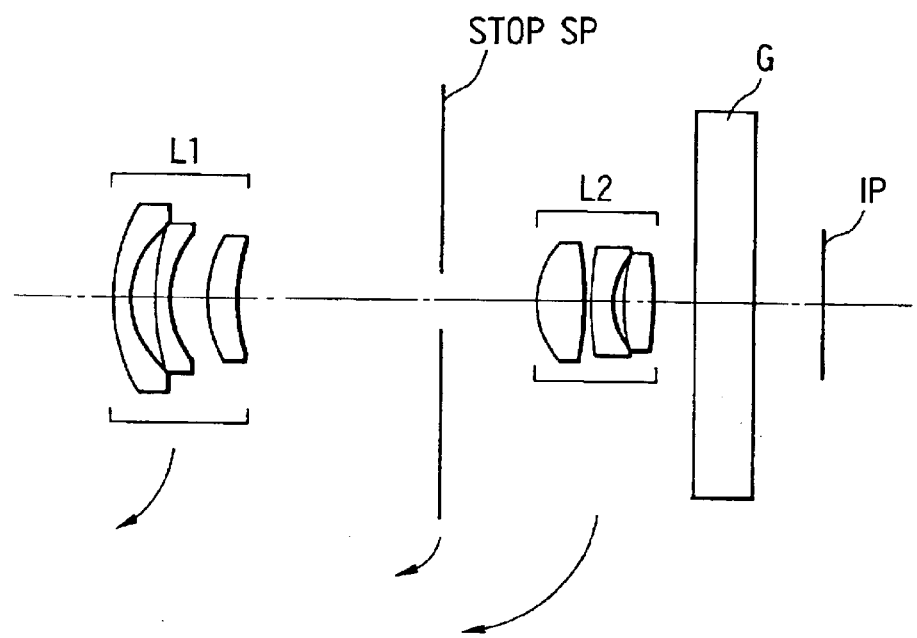
FIG. 5 is a longitudinal section view of a numerical example 5 of the zoom lens at the wide-angle end.
Figure 6:
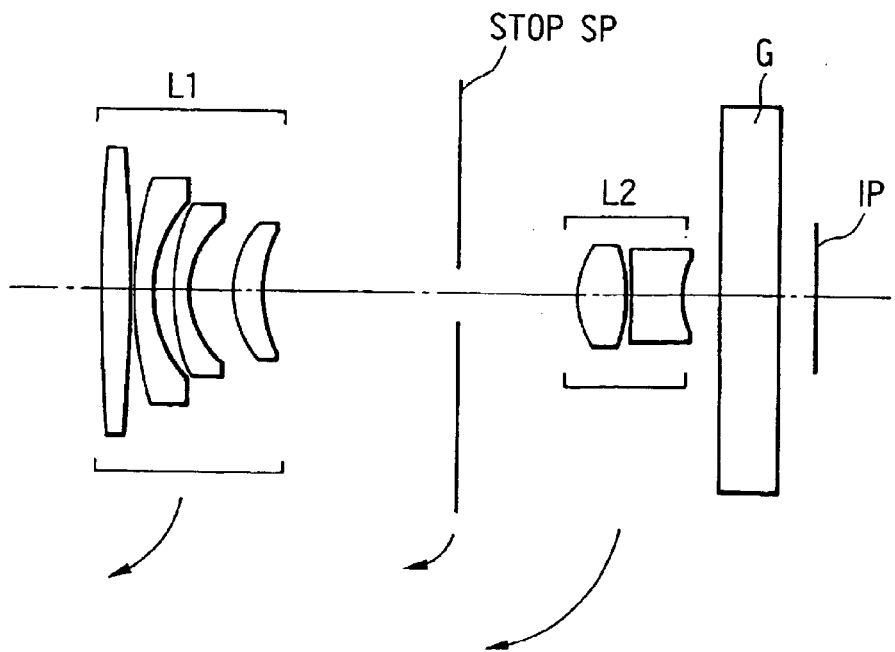
FIG. 6 is a longitudinal section view of a numerical example 6 of the zoom lens at the wide-angle end.
Figure 7:
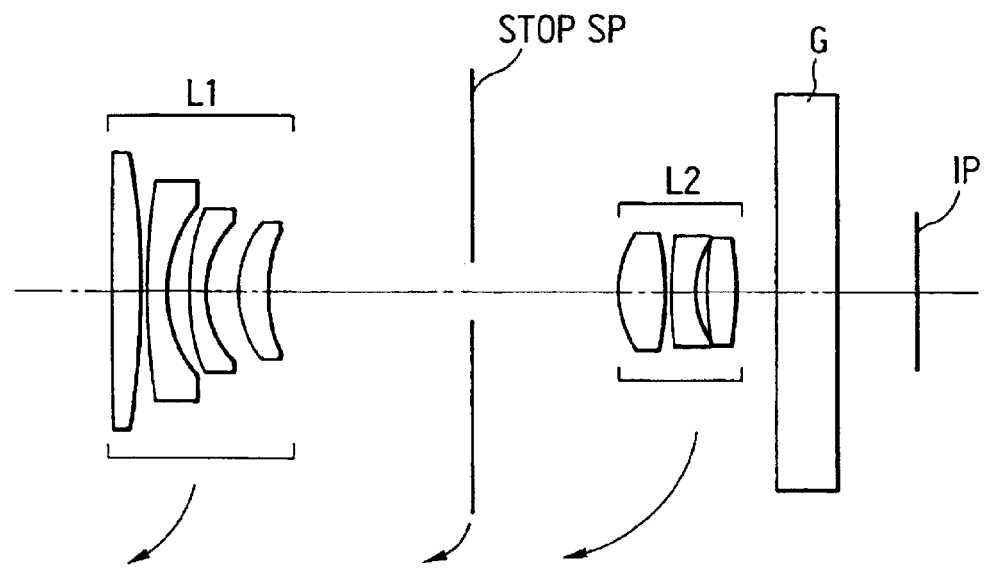
FIG. 7 is a longitudinal section view of a numerical example 7 of the zoom lens at the wide-angle end.
Figure 8:
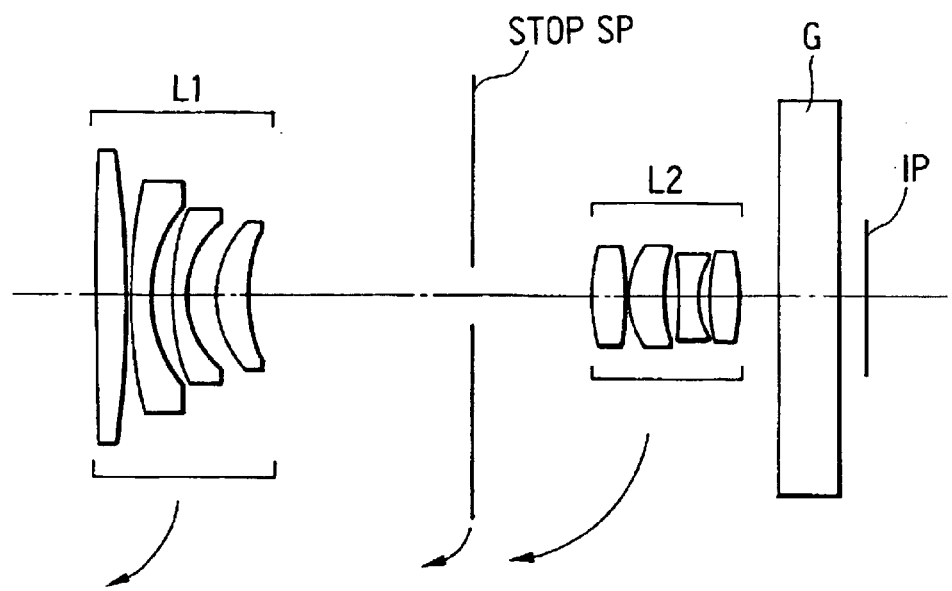
FIG. 8 is a longitudinal section view of a numerical example 8 of the zoom lens at the wide-angle end.
Figure 9:
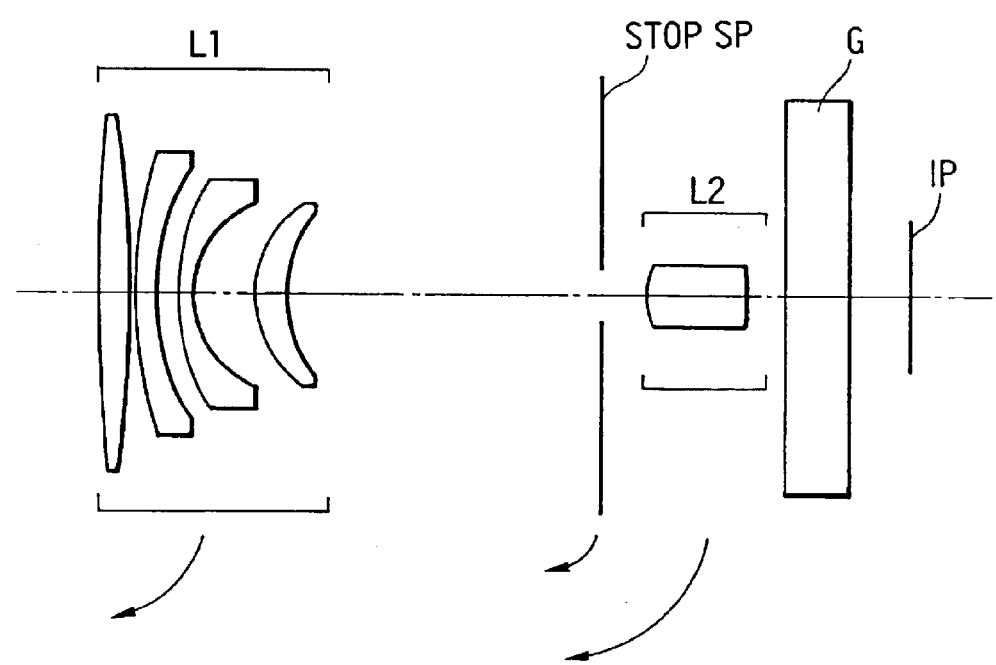
FIG. 9 is a longitudinal section view of a numerical example 9 of the zoom lens at the wide-angle end.
Figures 12A, 12B, 12C, 12D:
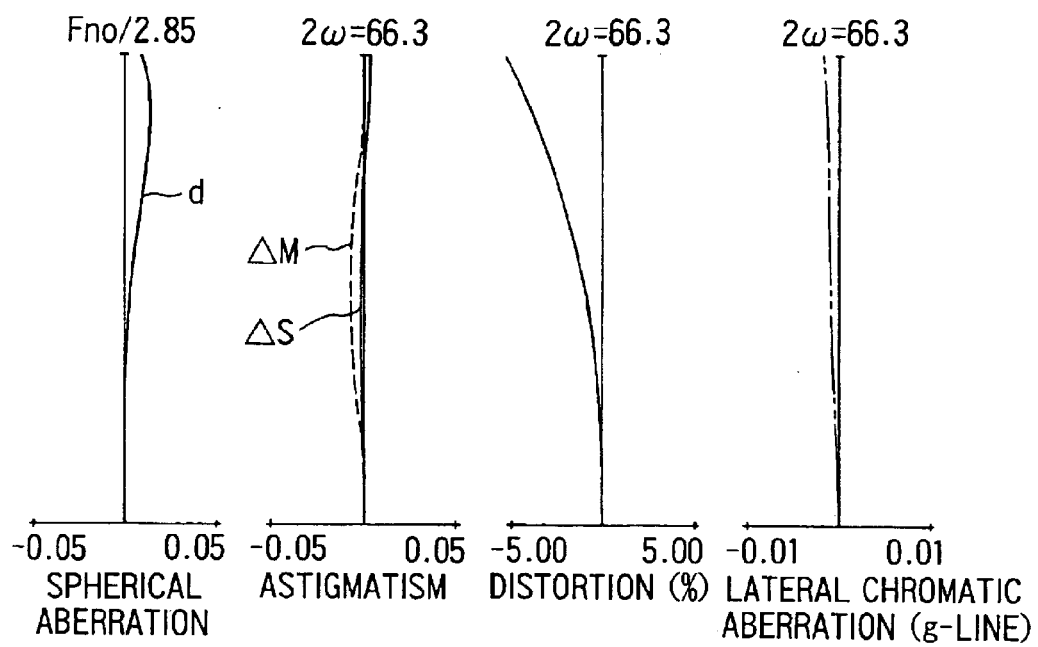
FIGS. 12A to 12D are graphic representations of the various aberrations of the numerical example 2 at the wide-angle end.
Figures 13A, 13B, 13C, 13D:
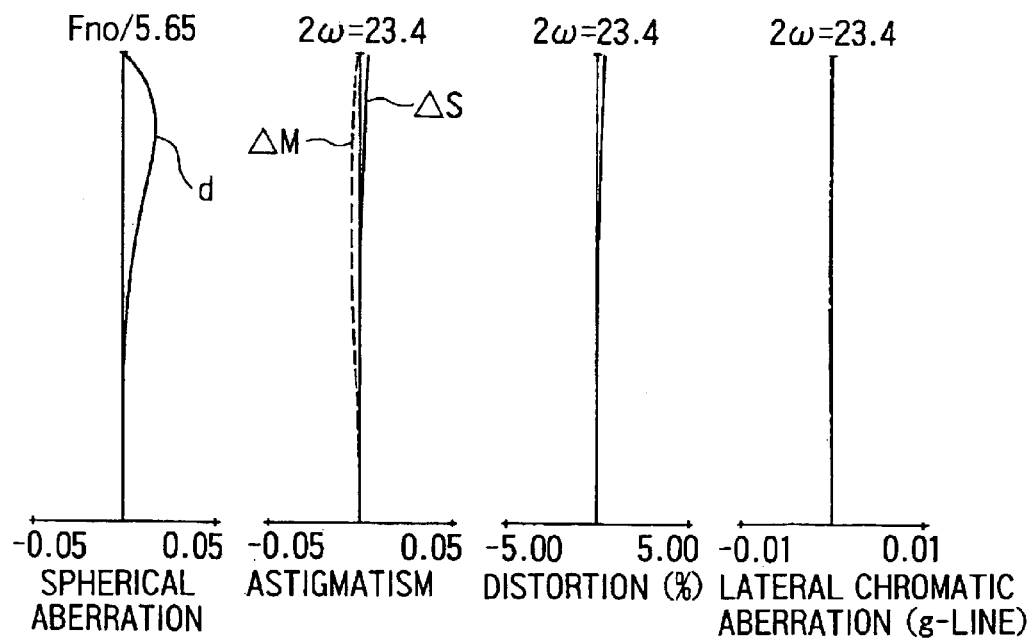
FIGS. 13A to 13D are graphic representations of the various aberrations of the numerical example 2 at the telephoto end.
Figures 16A, 16B, 16C, 16D:
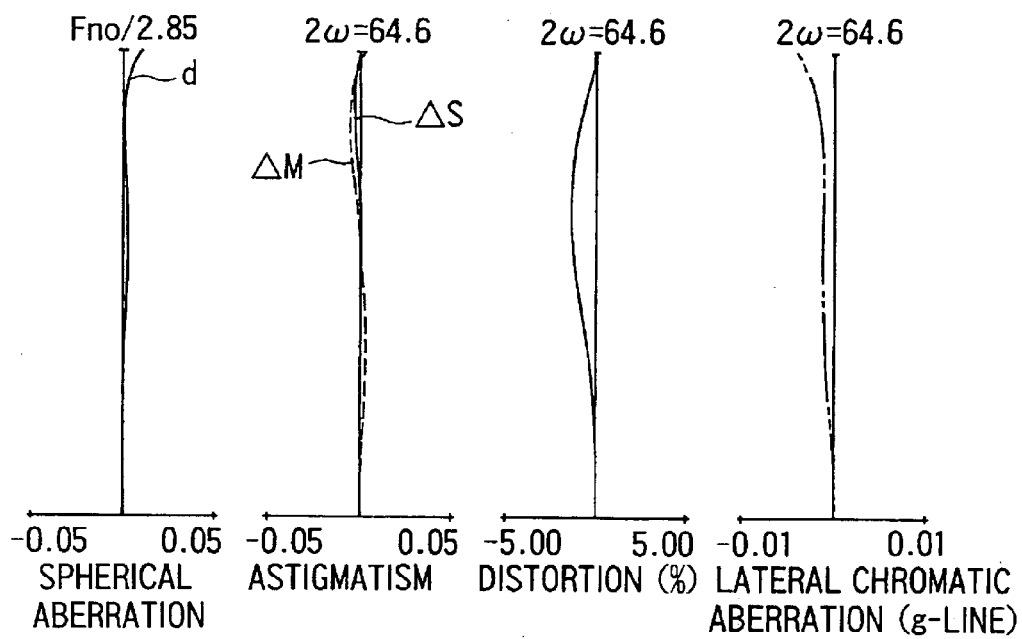
FIGS. 16A to 16D are graphic representations of the various aberrations of the numerical example 4 at the wide-angle end.
Figures 17A, 17B, 17C, 17D:
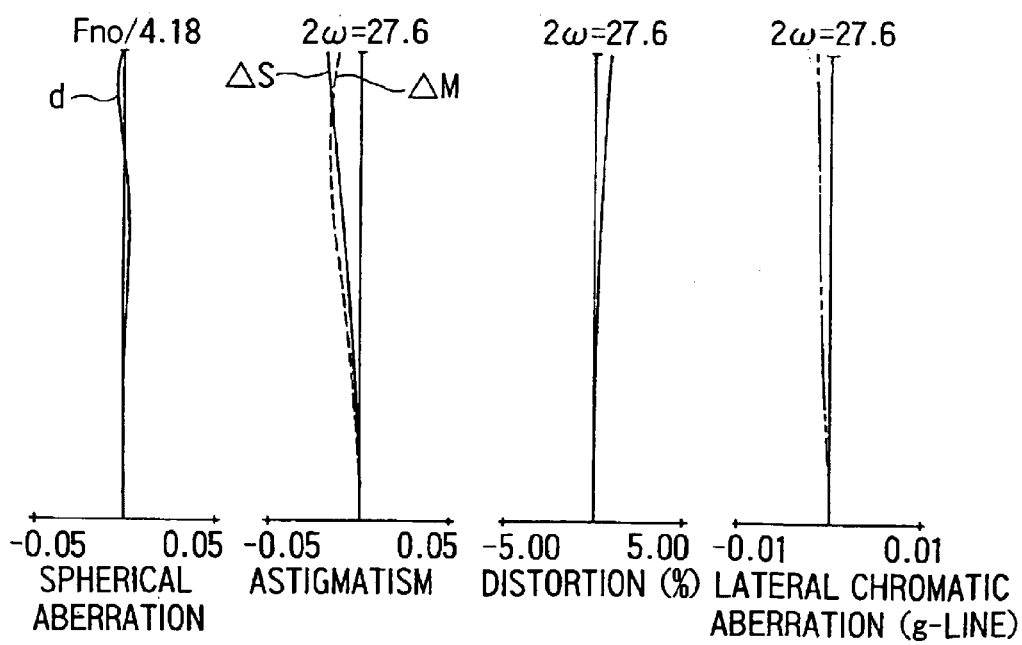
FIGS. 17A to 17D are graphic representations of the various aberrations of the numerical example 4 at the telephoto end.
Figures 18A, 18B, 18C, 18D:
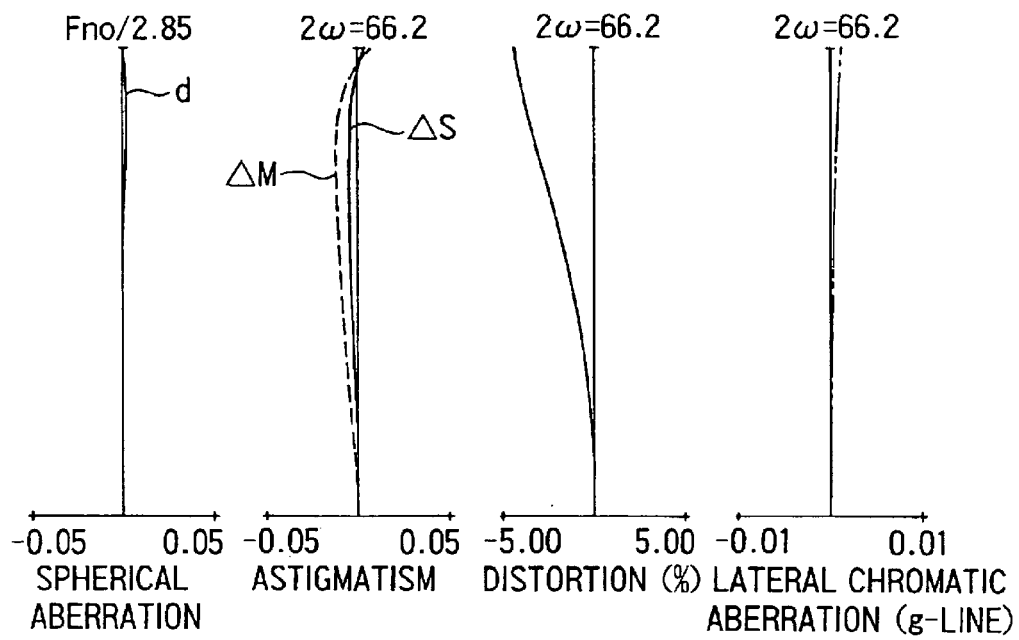
FIGS. 18A to 18D are graphic representations of the various aberrations of the numerical example 5 at the wide-angle end.
Figures 19A, 19B, 19C, 19D:
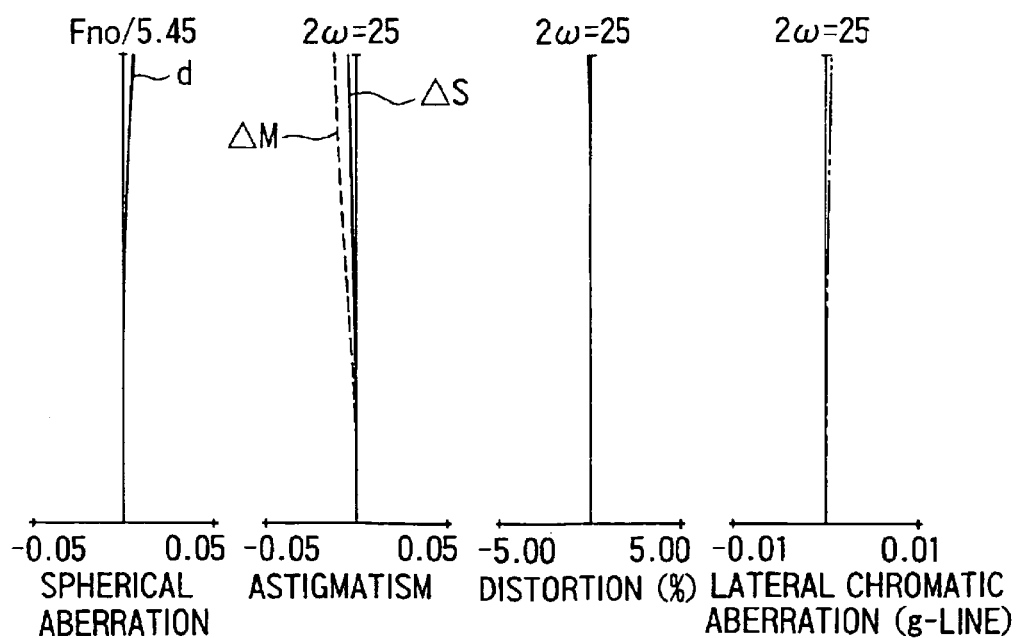
FIGS. 19A to 19D are graphic representations of the various aberrations of the numerical example 5 in the telephoto end.
Figures 20A, 20B, 20C, 20D:
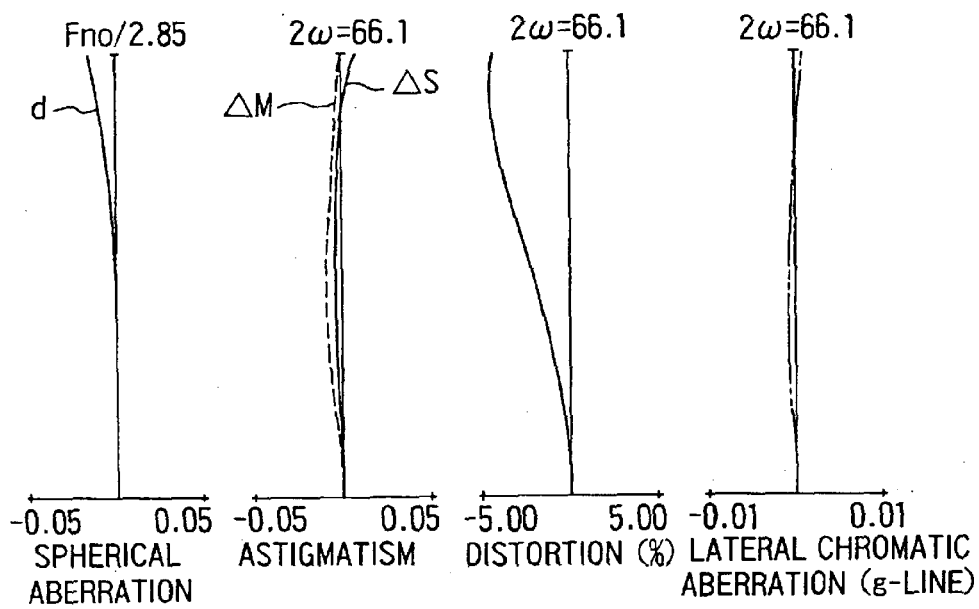
FIGS. 20A to 20D are graphic representations of the various aberrations of the numerical example 6 at the wide-angle end.
Figures 21A, 21B, 21C, 21D:
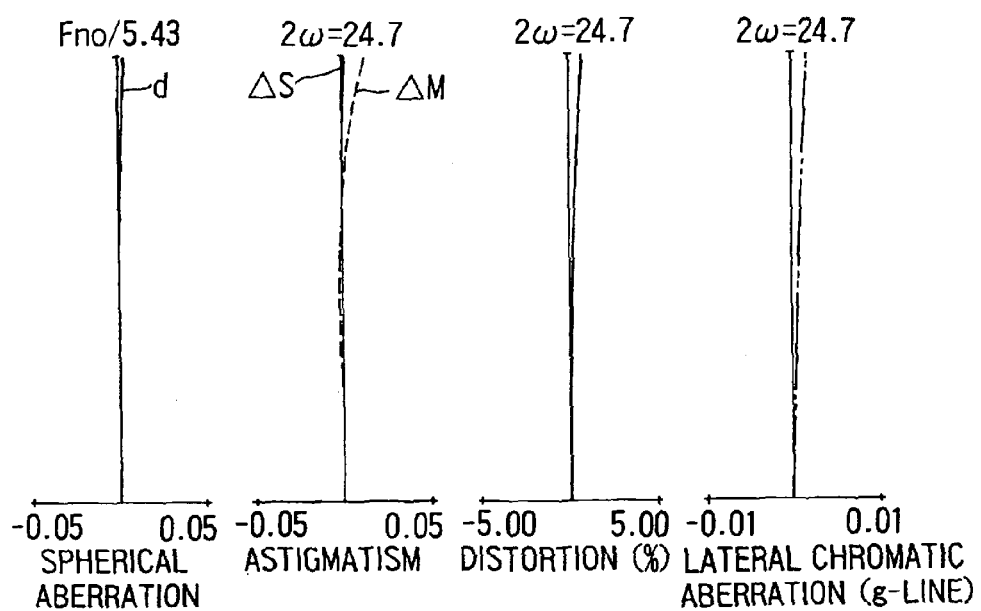
FIGS. 21A to 21D are graphic representations of the various aberrations of the numerical example 6 at the telephoto end.
Figures 22A, 22B, 22C, 22D:
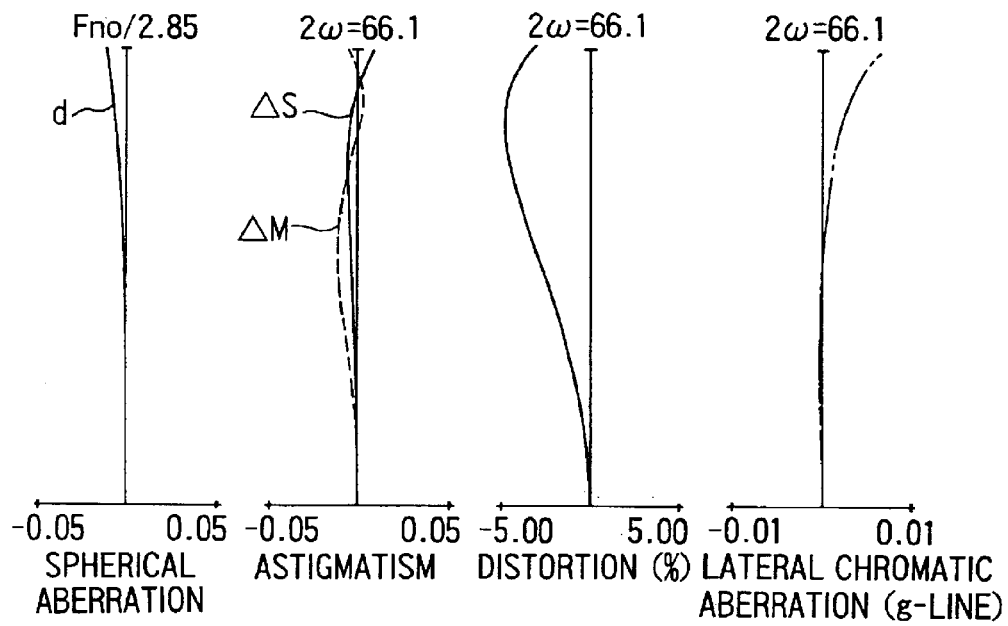
FIGS. 22A to 22D are graphic representations of the various aberrations of the numerical example 7 at the wide-angle end.
Figures 23A, 23B, 23C, 23D:
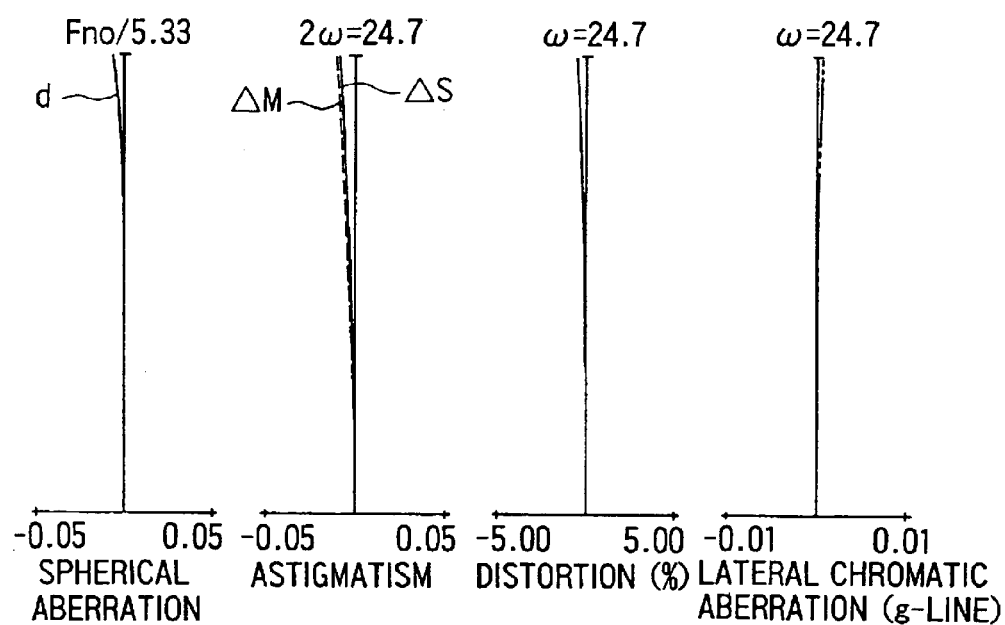
FIGS. 23A to 23D are graphic representations of the various aberrations of the numerical example 7 at the telephoto end.
Figures 26A, 26B, 26C, 26D:
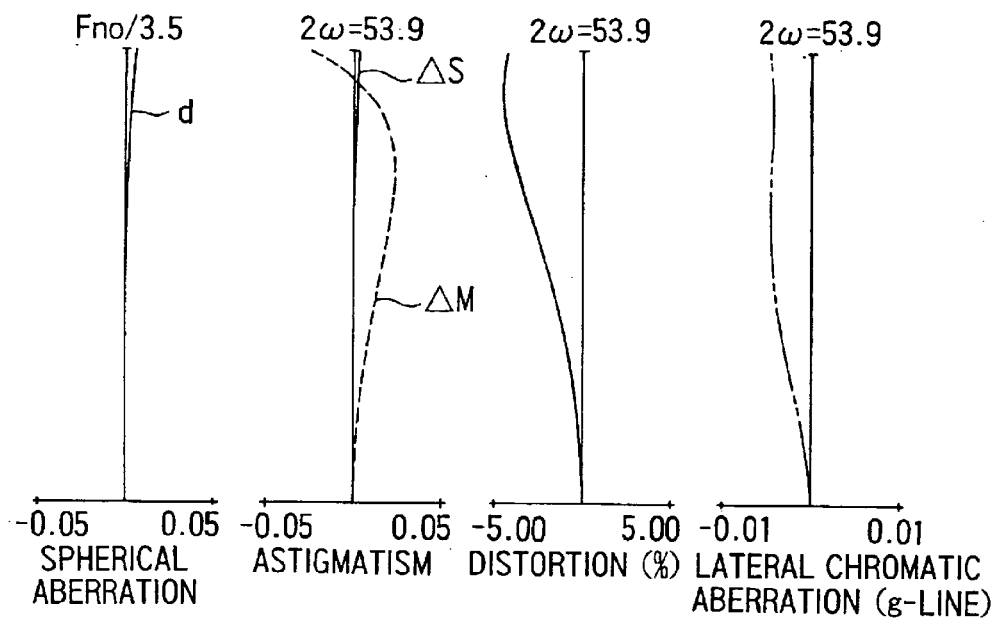
FIGS. 26A to 26D are graphic representations of the various aberrations of the numerical example 9 at the wide-angle end.
Figures 27A, 27B, 27C, 27D:
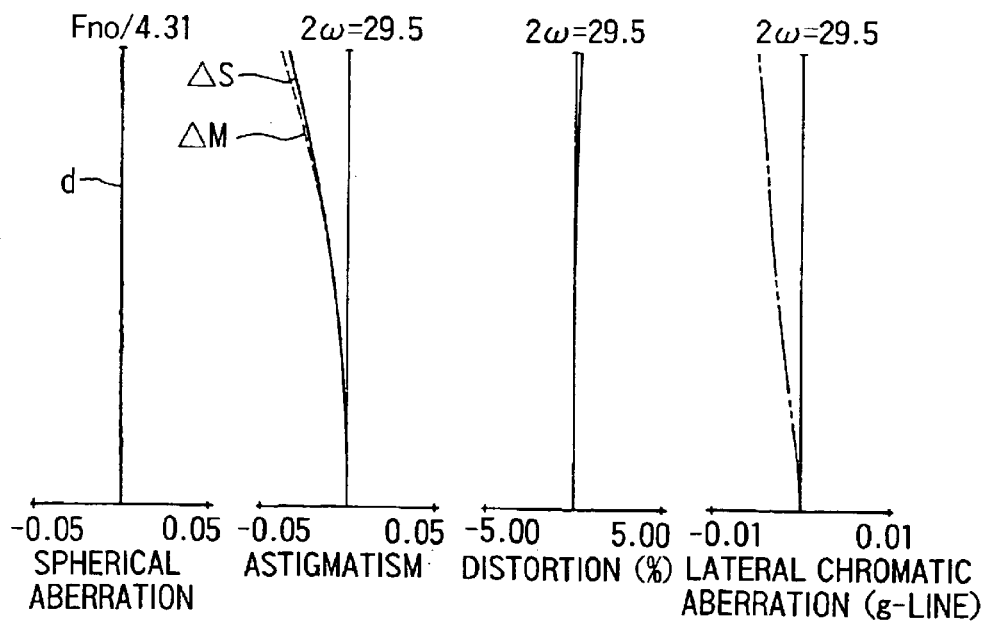
FIGS. 27A to 27D are graphic representations of the various aberrations of the numerical example 9 at the telephoto end.

Hereinafter, preferred embodiments of the invention will be described in detail with reference to the drawings.

FIGS. 1 to 9 are lens block diagrams showing numerical examples 1 to 9 the zoom lenses according to an embodiment of the invention, respectively. In FIGS. 1 to 9, reference character L1 denotes a first lens unit of negative refractive power, reference character L2 denotes a second lens unit of positive refractive power, reference character SP denotes a stop, and reference character IP denotes an image plane at which an image pickup element, such as a CCD, is disposed. Reference character G denotes a glass block, such as a filter or a phase plate. During zooming from the wide-angle end to the telephoto end, the first and second lens units axially move toward the object side, while reducing the separation therebetween, as indicated by the arrows in FIGS. 1 to 9. In the present embodiment, the function of varying the focal length is realized mainly by moving the second lens unit. The shift of the image plane with a variation of the focal length is compensated for by moving the first lens unit. The stop SP axially moves toward the object side during zooming either independently of the first and second lens units or in unison with the second lens unit. Focusing is performed by moving the first or second lens unit or the entire lens system.

In the present embodiment, for the first and second lens units, the numbers of lens elements to be used are so determined as to satisfy the conditions (1) and (2) described above. The lens design is thus simplified. Nonetheless, a good optical performance is obtained throughout the entire zooming range and over all the entire area of an image frame.

Next, the technical significance of each of the above-described conditions (1) and (2) is explained below.

The inequalities of condition (1) represent a condition necessary for the 2-unit zoom lens to insure that the lens system is suppressed in bulk and size from increasing greatly, without causing the first lens unit to produce large aberrations. They relate also to the necessity of simultaneously assuring that any of the lens elements constituting the first lens unit does not take an unfavorable form for economical production by molding.

It is preferred to construct the first lens unit with the inclusion of at least one positive lens and the second lens unit with the inclusion of at least one negative lens, so that each lens unit is suppressed from producing aberrations including chromatic ones. Here, if the first lens unit is composed of only one negative lens, the refractive power of that negative lens becomes much too strong, so that the distortion increases greatly. Another problem is that, to make a photographic lens whose field angle is wide enough, the difference in thickness between the paraxial and marginal zones of the negative lens becomes too large to use the molding technique. To avoid these at once, it is preferred that the first lens unit has two or more negative lenses which contribute equally to the negative refractive power.

Further, after the first lens unit has thus been corrected for the aberrations to a minimum, the second lens unit as the main variator has to co-operate so that the entire lens system is sufficiently reduced in size in such a manner as to suppress the total aberrations to a minimum. For this purpose, it is preferred that the condition (2) described above is satisfied.

In this connection, it is to be noted that the first lens unit has at least one aspheric surface. With this aspheric surface, even when the number of constituent lenses is relatively few, the image aberrations can be corrected advantageously.

In actual practice, the first lens unit is constructed with the inclusion of, in order from the object side, two negative lenses each having a concave surface toward the image side and a positive lens having a convex surface facing the object side.

Now, in relation to the values of the factor NL2 described above, the invention sets forth rules of design for the second lens unit as follows.

(a-1) When the number of lens elements "NL2" is NL2=1, the Abbe number υP of the material of the lens element constituting the second lens unit lies within the following range:

$$50 < \upsilon P$$

This is a desired condition on correction of chromatic aberrations-for good stability during zooming. To further reduce the chromatic aberrations, it is preferred to satisfy the following condition:

$$75 < \upsilon P$$

(a-2) When the number of lens elements "NL2" is NL2 =2, it is preferred that the second lens unit consists of, in order from the object side, a positive lens of bi-convex form and a negative lens having a concave surface of stronger refractive power facing the image side than that of an opposite surface thereof.

In particular, the positive lens of bi-convex form has a convex surface of stronger curvature facing the object side than that of an opposite surface thereof, and the negative lens is in the form of a meniscus lens concave toward the image side.

(a-3) When the number of lens elements "NL2" is NL2 =3, it is preferred that the second lens unit includes a negative lens of meniscus form concave toward the image side.

It should be also pointed out that, if the second lens unit is composed of, in order from the object side, a positive lens of bi-convex form having a convex surface of stronger curvature facing the object side than that of an opposite surface thereof, a negative lens of meniscus form having a concave surface of stronger curvature facing the image side than that of an opposite surface thereof and a positive lens, the back focal distance is suitably increased to increase the distance of the exit pupil.

Further, the second lens unit contributes to a major variation of the focal length of the zoom lens, and the amount of movement of the second lens unit for variation of the focal length, too, is large. For this reason, it is better that the second lens unit is small in size and light in weight in view of moving the second lens unit as a system. Concretely speaking, the second lens unit comprises, in order from the object side:

(i) one positive lens alone;
(ii) one positive lens and one negative lens;
(iii) a positive lens, a negative lens and a positive lens; or
(iv) a positive lens, a positive lens, a negative lens and a positive lens.

Any of these constructions and arrangements is preferable. In the cases of (i), (ii) and (iii), it is preferred to provide the second lens unit with at least one aspheric surface. Even in the case of (iv), the aspheric surface may be employed, but it is possible to leave that surface in spherical form. (In this case, although depending on the degree of balance of the corrected aberrations, this construction is rather preferable when the first lens unit is made from four lens elements).

Further, it is preferred that the aperture stop is disposed in the space between the first and second lens units.

The zoom lens of the invention has its constituent lens elements made to take various forms in each lens unit. These forms are described below.

(b-1) The first lens unit consists of two negative lenses of meniscus form convex toward the object side and a positive lens of meniscus form convex toward the object side and side. The second lens unit consists of a positive lens of bi-convex form and a negative lens having a concave surface facing the image side.

(b-2) The first lens unit consists of two negative lenses of meniscus form convex toward the object side and a positive lens of meniscus form convex toward the object side. The second lens unit consists of a positive lens of meniscus form convex toward the object side.

(b-3) The first lens unit consists of two negative lenses of meniscus form convex toward the object side and a positive lens of meniscus form convex toward the object side. The second lens unit consists of a positive lens of bi-convex form, a negative lens of meniscus form convex toward the object side and a positive lens of bi-convex form.

(b-4) The first lens unit consists of a positive lens of bi-convex form, two negative lenses of meniscus form convex toward the object side and a positive lens of meniscus form convex toward the object side. The second lens unit consists of a positive lens of bi-convex form and a negative lens having a concave surface facing the image side.

(b-5) The first lens unit consists of a positive lens of bi-convex form, two negative lenses of meniscus form convex toward the object side and a positive lens of meniscus form convex toward the object side. The second lens unit consists of a positive lens of bi-convex form, a negative lens of meniscus form convex toward the object side and a positive lens of bi-convex form.

(b-6) The first lens unit consists of a positive lens of bi-convex form, two negative lenses of meniscus form convex toward the object side and a positive lens of meniscus form convex toward the object side. The second lens unit consists of a positive lens of bi-convex form, a positive lens of meniscus form convex toward the object side, a negative lens of bi-concave form and a positive lens of bi-convex form.

(b-7) The first lens unit consists of a positive lens of bi-convex form, two negative lenses of meniscus form convex toward the object side and a positive lens of meniscus form convex toward the object side. The second lens unit consists of a positive lens of bi-convex form.

The characteristic features of the lens design of the numerical examples 1 to 9 are described below.

(Numerical Example 1 (FIG. 1))

The forms and the construction and arrangement of the constituent lenses of the numerical example 1 are similar to those of the prescript (b-1) described above. This zoom lens has an aperture stop SP disposed in the space between the first and second lens units and arranged to axially move independently of the lens units during zooming.

In the numerical example 1, as the stop SP moves slightly during zooming, it may be made completely fixed instead. An aspheric surface is put in the one of the negative lenses of the first lens unit which is smaller in diameter than the other at the rear surface (the fourth surface) thereof, thus taking into account that the difference in thickness between the paraxial and marginal zones does not become so large that the form becomes unfavorable for making the aspherical lens by molding. For this purpose, the negative lens that contributes to the negative refractive power of the first lens unit is made two in number.

The second lens unit is constructed with two lenses. Its frontmost surface (the eighth surface) is made aspherical to remove spherical aberration and coma, and its rearmost surface (the eleventh surface), too, is made aspherical to remove spherical aberration and curvature of field.

(Numerical Example 2 (FIG. 2))

The zoom lens of the numerical example 2 is also designed based on the prescript (b-1) and has an aperture stop SP disposed adjacent to the second lens unit on the object side thereof.

In the numerical example 2, the stop SP moves together with the second lens unit. For the first lens unit, from the same reason as described before, two negative lenses are used so that the one which is smaller in diameter is made aspherical at the rear surface (the fourth surface) thereof.

For the second lens unit with two lenses, the frontmost surface (the eighth surface) is made aspherical to remove spherical aberration and coma and the rearmost surface (the eleventh surface), too, is made aspherical to remove spherical aberration and curvature of field.

(Numerical Example 3 (FIG. 3))

The form and the construction and arrangement of the constituent lenses of the numerical example 3 are similar to the prescript (b-2). The numerical example 3 has an aperture stop SP disposed adjacent to the second lens unit on the object side thereof.

In the numerical example 3, too, the stop SP moves together with the second lens unit. An aspheric surface is put in the one of the negative lenses of the first lens unit which is smaller in diameter than the other at the rear surface (the fourth surface) thereof, thus taking it into account that the difference in thickness between the paraxial and marginal zones does not become so large that the form becomes unfavorable for making the aspherical lens by molding. For this purpose, the negative lens that contributes to the negative refractive power of the first lens unit is made two in number.

The second lens unit is constructed with only one positive lens of meniscus form, whose front surface (the eighth surface) is made aspherical to remove spherical aberration and coma. Another aspheric surface is provided in the rear surface (the ninth surface) to remove spherical aberration and curvature of field.

(Numerical Example 4 (FIG. 4))

The lens units of the numerical example 4 are designed also based on the prescript (b-2) cited above. The numerical example 4 has an aperture stop SP disposed in the space between the first and second lens units and arranged to axially move independently of the lens units an during zooming.

In the numerical example 4, the stop SP moves slightly during zooming, but may be made completely fixed instead. An aspheric surface is put in the one of the negative lenses of the first lens unit, which is smaller in diameter than the other at the rear surface (the fourth surface) thereof, thus taking into account that the difference in thickness between the paraxial and marginal zones does not become so large that the form becomes unfavorable for making the aspherical lens by molding. For this purpose, the negative lens that contributes to the negative refractive power of the first lens unit is made two in number.

The second lens unit is constructed with only one positive lens of meniscus form. Because the number of constituent lenses is very few, the glass to be used is made especially small in dispersion for the purpose of removing chromatic aberrations.

In particular, the front surface (the eighth surface) is made aspherical to remove spherical aberration and coma. Even the rear surface (the ninth surface) is provided with another aspheric surface to remove spherical aberration and curvature of field.

(Numerical Example 5 (FIG. 5))

The zoom lens of the numerical example 5 is designed based on the prescript (b-3) and has an aperture stop SP disposed in the space between the first and second lens units and arranged to axially move independently of the lens units during zooming.

In the numerical example 5, the stop SP moves slightly during zooming, but may be made completely fixed instead. An aspheric surface is put in the one of the negative lenses of the first lens unit which is smaller in diameter than the other at the rear surface (the fourth surface) thereof, thus taking into account that the difference in thickness between the paraxial and marginal zones does not become so large that the form becomes unfavorable for making the aspherical lens by molding. For this purpose, the negative lens that contributes to the negative refractive power of the first lens unit is made two in number.

The second lens unit is constructed with three lenses, i.e., a positive lens, a negative lens and a positive lens.

More specifically, a positive lens of bi-convex form having a convex surface of stronger curvature facing the object side than that of an opposite surface thereof, a negative lens of meniscus form concave toward the image side and a positive lens are arranged in this order from the object side in the second lens unit. This arrangement is suited particularly to an increase in the back focal distance and, therefore, to an increase in the distance of the exit pupil. In particular, the frontmost surface (the eighth surface) is made aspherical to remove spherical aberration and coma.

(Numerical Example 6 (FIG. 6))

The zoom lens of the numerical example 6 is designed based on the prescript (b-4) and has an aperture stop SP disposed in the space between the first and second lens units and arranged to axially move independently of the lens units during zooming.

In the numerical example 6, the stop SP moves slightly during zooming, but may be made completely fixed instead.

The first lens unit is constructed with four spherical lenses, differing from the numerical examples 1 to 5 in that the distortion the first lens unit otherwise would produce is removed not by the aspherical surface that is difficult to make by molding, but adequately by using a positive lens as arranged on the object side.

The second lens unit is constructed with two lenses, i.e., a positive lens having a convex surface of stronger curvature facing the object side than that of an opposite surface thereof and a negative lens having a concave surface of stronger curvature facing the image side than that of an opposite surface thereof. In the numerical example 6, the lenses constituting the second lens unit are the positive one of bi-convex form and the negative one of bi-concave form. In particular, for the positive lens, the front surface (the eighth surface) is made aspherical to remove spherical aberration and coma. Even for the negative lens, the rear surface (the thirteenth surface) is provided with an aspheric surface to remove spherical aberration and curvature of field.

(Numerical Example 7 (FIG. 7))

The zoom lens of the numerical example 7 is designed based on the prescript (b-5) and has an aperture stop SP disposed in the space between the first and second lens units and arranged to axially move independently of the lens units during zooming.

Even in the numerical example 7, the stop SP moves slightly during zooming, but may be made completely fixed instead.

The first lens unit is constructed with four spherical lenses, differing from the numerical examples 1 to 5 in that, similarly to the numerical example 6, the distortion the first lens unit otherwise would produce is removed not by the aspherical surface that is difficult to make by molding, but adequately by using a positive lens as arranged on the object side.

The second lens unit is constructed with three lenses, i.e., a positive lens, a negative lens and a positive lens.

More specifically, a positive lens of bi-convex form having a convex surface of stronger curvature facing the object side than that of an opposite surface thereof, a negative lens of meniscus form concave toward the image side and a positive lens are arranged in this order from the object side in the second lens unit. This arrangement is particularly suited to an increase in the back focal distance and, therefore, to an increase in the distance of the exit pupil. In particular, for the front one of the positive lenses, the front surface (the tenth surface) is provided with an aspheric surface for removing spherical aberration and coma.

(Numerical Example 8 (FIG. 8))

The zoom lens of the numerical example 8 is designed based on the prescript (b-6) and has an aperture stop SP disposed in the space between the first and second lens units and arranged to axially move independently of the lens units during zooming.

Even in the numerical example 8, the stop SP moves slightly during zooming, but may be made completely fixed instead.

The numerical example 8 has its first lens unit made with four spherical lenses and its second lens unit also with four spherical lenses, thus removing the distortion the first lens unit otherwise would produce adequately by using not the aspherical surface that is difficult to make by molding, but additional positive lenses as arranged on the object side of either of the lens units. Further, spherical aberration and coma are removed by increasing the number of spherical lenses, especially positive lenses.

More specifically, the second lens unit consists of, in order from the object side, a positive lens of bi-convex form having a convex surface of stronger curvature facing the object side than that of an opposite surface thereof, a positive lens of meniscus form concave toward the image side, a negative lens of bi-concave form and a positive lens, thereby giving the advantage of removing spherical aberration and coma.

(Numerical Example 9 (FIG. 9))

The zoom lens of the numerical example 9 is designed based on the prescript (b-7). Also, the first lens unit is, similarly to the numerical examples 6, 7 and 8, constructed with four lenses and the second lens unit with a positive lens of bi-convex form, thereby effecting similar results to those of the above examples.

Next, the numerical data for the nine numerical examples 1 to 9 of the invention are shown in tables, where Ri is the radius of curvature of the i-th lens surface, when counted from the object side, Di is the i-th axial lens thickness or air separation, when counted from the object side, and Ni and vi are respectively the refractive index and Abbe number of the material of the i-th optical element, when counted from the object side.

The shape of an aspheric surface is expressed in the coordinates with an X axis in the axial directions (in which light advances) and a Y axis in the direction perpendicular to an optical axis, by the following equation:

$$X = \frac{(1/R)Y^2}{1 + \sqrt{1 - (1+K)(Y/R)^2}} + AY^2 + BY^4 + CY^6 + DY^8 + EY^{10}$$

where R is the radius of the osculating sphere, and K, A, B, C, D and E are the aspheric coefficients. In the values of the aspheric coefficients, the notation: "e-X" means "×10$^{-X}$".

The aberrations for the wide-angle end of the zoom lens of the numerical example 1 are shown in FIGS. 10A to 10D, and the aberrations for the telephoto end in FIGS. 11A to 11D. The aberrations for the wide-angle end of the zoom lens of the numerical example 2 are shown in FIGS. 12A to 12D, and the aberrations for the telephoto end in FIGS. 13A to 13D. The aberrations for the wide-angle end of the zoom lens of the numerical example 3 are shown in FIGS. 14A to 14D, and the aberrations for the telephoto end in FIGS. 15A to 15D. The aberrations for the wide-angle end of the zoom lens of the numerical example 4 are shown in FIGS. 16A to 16D, and the aberrations for the telephoto end in FIGS. 17A to 17D. The aberrations for the wide-angle end of the zoom lens of the numerical example 5 are shown in FIGS. 18A to 18D, and the aberrations for the telephoto end in FIGS. 19A to 19D. The aberrations for the wide-angle end of the zoom lens of the numerical example 6 are shown in FIGS. 20A to 20D, and the aberrations for the telephoto end in FIGS. 21A to 21D. The aberrations for the wide-angle end of the zoom lens of the numerical example 7 are shown in FIGS. 22A to 22D, and the aberrations for the telephoto end in FIGS. 23A to 23D. The aberrations for the wide-angle end of the zoom lens of the numerical example 8 are shown in FIGS. 24A to 24D, and the aberrations for the telephoto end in FIGS. 25A to 25D. The aberrations for the wide-angle end of the zoom lens of the numerical example 9 are shown in FIGS. 26A to 26D, and the aberrations for the telephoto end in FIGS. 27A to 27D.

Numerical Example 1:

| | | | | | | | |
|---|---|---|---|---|---|---|---|
| f = 1~3.18 | | Fno = 2.69~5.65 | | 2ω = 66.3°~23.2° | | | |
| R1 = | 3.038 | D1 = | 0.27 | N1 = | 1.772499 | v1 = | 49.6 |
| R2 = | 1.352 | D2 = | 0.31 | | | | |
| R3 = | 3.049 | D3 = | 0.21 | N2 = | 1.693501 | v2 = | 53.2 |
| R4 = | 1.329 | D4 = | 0.63 | | | | |
| R5 = | 2.036 | D5 = | 0.40 | N3 = | 1.698947 | v3 = | 30.1 |
| R6 = | 4.030 | D6 = | Variable | | | | |
| R7 = | Stop | D7 = | Variable | | | | |
| R8 = | 1.147 | D8 = | 0.69 | N4 = | 1.583126 | v4 = | 59.4 |
| R9 = | -2.254 | D9 = | 0.04 | | | | |
| R10 = | -26.583 | D10 = | 0.72 | N5 = | 1.805181 | v5 = | 25.4 |
| R11 = | 1.685 | D11 = | Variable | | | | |

-continued

|  | f = 1~3.18 | Fno = 2.69~5.65 | 2ω = 66.3°~23.2° |  |  |
|---|---|---|---|---|---|
| G | R12 = ∞ | D12 = 0.83 | N6 = 1.516330 | ν6 = 64.2 |
|   | R13 = ∞ |  |  |  |

|  | Focal Length |  |  |
|---|---|---|---|
| Variable Separation | 1.00 | 2.70 | 3.18 |
| D6  | 2.70 | 0.43 | 0.39 |
| D7  | 2.04 | 0.59 | 0.29 |
| D11 | 0.53 | 1.89 | 2.28 |

Asperic Coefficients:

| R4:  | K = −7.52762e−01 | B = −1.40160e−02 | C = 1.28780e−02 |
|      | D = −3.58445e−03 | E = −1.65803e−03 |                 |
| R8:  | K = −4.08535e−01 | B = −3.39944e−02 | C = −5.36474e−02 |
|      | D = 1.26615e−02  | E = −1.78521e−02 |                 |
| R11: | K = 4.02997e+00  | B = 1.29346e−01  | C = −6.10686e−02 |
|      | D = 8.45058e−02  | E = −8.09831e−01 |                 |

Numerical Example 2:

|  | f = 1~3.15 | Fno = 2.85~5.65 | 2ω = 66.3°~23.4° |  |  |
|---|---|---|---|---|---|
|   | R1 = 2.917   | D1 = 0.27    | N1 = 1.772499 | ν1 = 49.6 |
|   | R2 = 1.371   | D2 = 0.36    |               |           |
|   | R3 = 2.803   | D3 = 0.21    | N2 = 1.693501 | ν2 = 53.2 |
|   | R4 = 1.268   | D4 = 0.64    |               |           |
|   | R5 = 1.712   | D5 = 0.40    | N3 = 1.698947 | ν3 = 30.1 |
|   | R6 = 2.503   | D6 = Variable |              |           |
|   | R7 = Stop    | D7 = 0.29    |               |           |
|   | R8 = 1.127   | D8 = 0.69    | N4 = 1.583126 | ν4 = 59.4 |
|   | R9 = −2.352  | D9 = 0.04    |               |           |
|   | R10 = 306.001 | D10 = 0.72  | N5 = 1.846660 | ν5 = 23.8 |
|   | R11 = 1.745  | D11 = Variable |             |           |
| G | R12 = ∞      | D12 = 0.83   | N6 = 1.516330 | ν6 = 64.2 |
|   | R13 = ∞      |              |               |           |

|  | Focal Length |  |  |
|---|---|---|---|
| Variable Separation | 1.00 | 2.68 | 3.15 |
| D6  | 3.89 | 0.73 | 0.45 |
| D11 | 0.53 | 1.95 | 2.35 |

Asperic Coefficients:

| R4:  | K = −1.20367e+00 | B = 3.30556e−02  | C = 7.80093e−03 |
|      | D = −6.28237e−03 | E = 7.51183e−04  |                 |
| R8:  | K = −5.02004e−01 | B = −2.86958e−02 | C = −5.57241e−02 |
|      | D = 4.16164e−02  | E = −4.39216e−02 |                 |
| R11: | K = 3.95146e+00  | B = 1.26054e−01  | C = −3.70316e−02 |
|      | D = 1.11331e+00  | E = −8.41197e+00 |                 |

Numerical Example 3:

|  | f = 1~2.65 | Fno = 2.85~4.53 | 2ω = 66.3°~27.6° |  |  |
|---|---|---|---|---|---|
|   | R1 = 2.851 | D1 = 0.27 | N1 = 1.719995 | ν1 = 50.2 |
|   | R2 = 1.458 | D2 = 0.45 |               |           |
|   | R3 = 2.563 | D3 = 0.21 | N2 = 1.693501 | ν2 = 53.2 |
|   | R4 = 1.317 | D4 = 0.51 |               |           |
|   | R5 = 1.755 | D5 = 0.40 | N3 = 1.698947 | ν3 = 30.1 |

-continued f = 1~2.65  Fno = 2.85~4.53  2ω = 66.3°~27.6°

|   | R6 = | 2.575 | D6 = | Variable |       |       |      |      |
|---|------|-------|------|----------|-------|-------|------|------|
|   | R7 = | Stop  | D7 = | 0.29     |       |       |      |      |
|   | R8 = | 1.072 | D8 = | 1.33     | N4 =  | 1.583126 | ν4 = | 59.4 |
|   | R9 = | 4.825 | D9 = | Variable |       |       |      |      |
| G | R10 = | ∞    | D10 = | 0.83    | N5 =  | 1.516330 | ν5 = | 64.2 |
|   | R11 = | ∞    |      |          |       |       |      |      |

|                     | Focal Length |      |      |
|---------------------|------|------|------|
| Variable Separation | 1.00 | 2.29 | 2.65 |
| D6                  | 4.48 | 0.83 | 0.44 |
| D9                  | 0.53 | 1.40 | 1.65 |

Asperic Coefficients:

| R4: | K = | −1.66705e+00 | B = | 6.47571e−02  | C = | −1.80043e−03 |
|-----|-----|--------------|-----|--------------|-----|--------------|
|     | D = | −7.71257e−03 | E = | 1.52496e−03  |     |              |
| R8: | K = | 1.87950e−01  | B = | −3.78366e−02 | C = | −4.27240e−02 |
|     | D = | 5.35924e−02  | E = | −2.12822e−01 |     |              |
| R9: | K = | 2.07670e+01  | B = | 2.46411e−01  | C = | 1.70155e−01  |
|     | D = | 1.20576e+00  | E = | −3.19385e+00 |     |              |

Numerical Example 4:

f = 1~2.57  Fno = 2.85~4.18  2ω = 64.4°~27.6°

|   | R1 = | 2.676 | D1 = | 0.26     | N1 = | 1.696797 | ν1 = | 55.5 |
|---|------|-------|------|----------|------|----------|------|------|
|   | R2 = | 1.510 | D2 = | 0.42     |      |          |      |      |
|   | R3 = | 2.624 | D3 = | 0.21     | N2 = | 1.693501 | ν2 = | 53.2 |
|   | R4 = | 1.148 | D4 = | 0.39     |      |          |      |      |
|   | R5 = | 1.666 | D5 = | 0.39     | N3 = | 1.698947 | ν3 = | 30.1 |
|   | R6 = | 3.315 | D6 = | Variable |      |          |      |      |
|   | R7 = | Stop  | D7 = | Variable |      |          |      |      |
|   | R8 = | 0.900 | D8 = | 1.28     | N4 = | 1.496999 | ν4 = | 81.5 |
|   | R9 = | 3.814 | D9 = | Variable |      |          |      |      |
| G | R10 = | ∞    | D10 = | 0.80    | N5 = | 1.516330 | ν5 = | 64.2 |
|   | R11 = | ∞    |      |          |      |          |      |      |

|                     | Focal Length |      |      |
|---------------------|------|------|------|
| Variable Separation | 1.00 | 2.22 | 2.57 |
| D6                  | 4.20 | 0.80 | 0.44 |
| D7                  | 1.16 | 0.39 | 0.28 |
| D9                  | 0.51 | 1.20 | 1.39 |

Asperic Coefficients:

| R4: | K = | −1.81994e+00 | B = | 1.06357e−01  | C = | −3.27203e−03 |
|-----|-----|--------------|-----|--------------|-----|--------------|
|     | D = | −9.67866e−03 | E = | 2.57786e−03  |     |              |
| R8: | K = | −7.07393e−02 | B = | −4.42876e−02 | C = | −9.75518e−02 |
|     | D = | 5.88472e−01  | E = | −1.46412e+00 |     |              |
| R9: | K = | 4.30997e+01  | B = | 2.90520e−01  | C = | 2.79491e−01  |
|     | D = | 2.32650e+00  | E = | −5.61094e+00 |     |              |

Numerical Example 5:

f = 1~2.94  Fno = 2.85~5.45  2ω = 66.2°~25.0°

| R1 = | 2.652 | D1 = | 0.27     | N1 = | 1.719995 | ν1 = | 50.2 |
|------|-------|------|----------|------|----------|------|------|
| R2 = | 1.310 | D2 = | 0.34     |      |          |      |      |
| R3 = | 3.511 | D3 = | 0.21     | N2 = | 1.693501 | ν2 = | 53.2 |
| R4 = | 1.332 | D4 = | 0.55     |      |          |      |      |
| R5 = | 1.876 | D5 = | 0.40     | N3 = | 1.846660 | ν3 = | 23.8 |
| R6 = | 2.795 | D6 = | Variable |      |          |      |      |

-continued

|  | f = 1~2.94 | Fno = 2.85~5.45 | 2ω = 66.2°~25.0° |  |  |  |  |
|---|---|---|---|---|---|---|---|
|  | R7 = | Stop | D7 = | Variable |  |  |  |
|  | R8 = | 1.187 | D8 = | 0.67 | N4 = 1.583126 | ν4 = | 59.4 |
|  | R9 = | −6.020 | D9 = | 0.08 |  |  |  |
|  | R10 = | 4.554 | D10 = | 0.32 | N5 = 1.846660 | ν5 = | 23.8 |
|  | R11 = | 1.058 | D11 = | 0.15 |  |  |  |
|  | R12 = | 2.733 | D12 = | 0.40 | N6 = 1.806098 | ν6 = | 40.9 |
|  | R13 = | −6.454 | D13 = | Variable |  |  |  |
| G | R14 = | ∞ | D14 = | 0.82 | N7 = 1.516330 | ν7 = | 64.2 |
|  | R15 = | ∞ |  |  |  |  |  |

|  | Focal Length | | |
|---|---|---|---|
| Variable Separation | 1.00 | 2.51 | 2.94 |
| D6 | 2.49 | 0.43 | 0.38 |
| D7 | 1.98 | 0.57 | 0.29 |
| D13 | 0.53 | 1.85 | 2.22 |

Asperic Coefficients:

| R4: | K = | −1.02220e+00 | B = | 1.54317e−02 | C = | 9.68593e−03 |
|---|---|---|---|---|---|---|
|  | D = | −9.33659e−03 | E = | −6.59126e−03 |  |  |
| R8: | K = | −1.83735e+00 | B = | 7.05969e−02 | C = | −2.75995e−02 |
|  | D = | 3.18968e−02 | E = | −1.80873e−02 |  |  |

Numerical Example 6:

|  | f = 1~2.97 | Fno = 2.85~5.43 | 2ω = 66.1°~24.7° |  |  |  |
|---|---|---|---|---|---|---|
| R1 = | 28.187 | D1 = | 0.40 | N1 = 1.846660 | ν1 = | 23.8 |
| R2 = | −26.411 | D2 = | 0.05 |  |  |  |
| R3 = | 4.823 | D3 = | 0.27 | N2 = 1.772499 | ν2 = | 49.6 |
| R4 = | 1.788 | D4 = | 0.31 |  |  |  |
| R5 = | 3.037 | D5 = | 0.21 | N3 = 1.693501 | ν3 = | 53.2 |
| R6 = | 1.324 | D6 = | 0.63 |  |  |  |
| R7 = | 1.532 | D7 = | 0.40 | N4 = 1.698947 | ν4 = | 30.1 |
| R8 = | 1.934 | D8 = | Variable |  |  |  |
| R9 = | Stop | D9 = | Variable |  |  |  |
| R10 = | 1.124 | D10 = | 0.69 | N5 = 1.583126 | ν5 = | 59.4 |
| R11 = | −2.052 | D11 = | 0.04 |  |  |  |
| R12 = | −32.290 | D12 = | 0.72 | N6 = 1.805181 | ν6 = | 25.4 |
| R13 = | 1.742 | D13 = | Variable |  |  |  |
| R14 = | ∞ | D14 = | 0.82 | N7 = 1.516330 | ν7 = | 64.2 |
| R15 = | ∞ |  |  |  |  |  |

|  | Focal Length | | |
|---|---|---|---|
| Variable Separation | 1.00 | 2.53 | 2.97 |
| D8 | 2.72 | 0.54 | 0.43 |
| D9 | 1.66 | 0.50 | 0.29 |
| D13 | 0.53 | 1.60 | 1.91 |

Asperic Coefficients:

| R10: | K = | −3.82272e−01 | B = | −5.51425e−02 | C = | −2.71024e−02 |
|---|---|---|---|---|---|---|
|  | D = | −6.56724e−02 | E = | 4.65365e−02 |  |  |
| R13: | K = | 4.61127e+00 | B = | 9.79659e−02 | C = | 2.47713e−01 |
|  | D = | −3.73650e+01 | E = | −7.28627e−01 |  |  |

Numerical Example 7:

|  | f = 1~2.97 | Fno = 2.85~5.33 | 2ω = 66.1°~24.7° |  |  |  |
|---|---|---|---|---|---|---|
| R1 = | 77.194 | D1 = | 0.40 | N1 = 1.846660 | ν1 = | 23.8 |
| R2 = | −12.262 | D2 = | 0.08 |  |  |  |

-continued f = 1~2.97  Fno = 2.85~5.33  2ω = 66.1°~24.7°

|   | | | | | | | |
|---|---|---|---|---|---|---|---|
| | R3 = | 10.325 | D3 = | 0.27 | N2 = | 1.772499 | ν2 = | 49.6 |
| | R4 = | 1.805 | D4 = | 0.31 | | | |
| | R5 = | 3.038 | D5 = | 0.21 | N3 = | 1.693501 | ν3 = | 53.2 |
| | R6 = | 1.325 | D6 = | 0.46 | | | |
| | R7 = | 1.517 | D7 = | 0.40 | N4 = | 1.698947 | ν4 = | 30.1 |
| | R8 = | 2.208 | D8 = | Variable | | | |
| | R9 = | Stop | D9 = | Variable | | | |
| | R10 = | 1.334 | D10 = | 0.64 | N5 = | 1.583126 | ν5 = | 59.4 |
| | R11 = | −4.412 | D11 = | 0.08 | | | |
| | R12 = | 8.019 | D12 = | 0.32 | N6 = | 1.846660 | ν6 = | 23.8 |
| | R13 = | 1.314 | D13 = | 0.14 | | | |
| | R14 = | 4.223 | D14 = | 0.40 | N7 = | 1.834000 | ν7 = | 37.2 |
| | R15 = | −4.136 | D15 = | Variable | | | |
| G | R16 = | ∞ | D16 = | 0.82 | N8 = | 1.516330 | ν8 = | 64.2 |
| | R17 = | ∞ | | | | | |

| | Focal Length | | |
|---|---|---|---|
| Variable Separation | 1.00 | 2.53 | 2.97 |
| D8 | 2.70 | 0.48 | 0.42 |
| D9 | 1.99 | 0.57 | 0.28 |
| D15 | 0.53 | 1.86 | 2.24 |

Asperic Coefficients:

R10: K = 1.45983e−01  B = −6.79192e−02  C = −2.53234e−02
     D = −2.73981e−03  E = −3.31441e−04

Numerical Example 8:

f = 1~2.93  Fno = 2.85~5.15  2ω = 65.9°~24.9°

| | | | | | | | |
|---|---|---|---|---|---|---|---|
| | R1 = | 52.653 | D1 = | 0.40 | N1 = | 1.846660 | ν1 = | 23.8 |
| | R2 = | −15.662 | D2 = | 0.08 | | | |
| | R3 = | 7.326 | D3 = | 0.26 | N2 = | 1.772499 | ν2 = | 49.6 |
| | R4 = | 1.845 | D4 = | 0.31 | | | |
| | R5 = | 3.025 | D5 = | 0.21 | N3 = | 1.693501 | ν3 = | 53.2 |
| | R6 = | 1.319 | D6 = | 0.42 | | | |
| | R7 = | 1.521 | D7 = | 0.40 | N4 = | 1.625882 | ν4 = | 35.7 |
| | R8 = | 2.364 | D8 = | Variable | | | |
| | R9 = | Stop | D9 = | Variable | | | |
| | R10 = | 2.473 | D10 = | 0.48 | N5 = | 1.583126 | ν5 = | 59.4 |
| | R11 = | −4.671 | D11 = | 0.05 | | | |
| | R12 = | 1.189 | D12 = | 0.48 | N6 = | 1.658441 | ν6 = | 50.9 |
| | R13 = | 2.602 | D13 = | 0.19 | | | |
| | R14 = | −9.676 | D14 = | 0.26 | N7 = | 1.846660 | ν7 = | 23.8 |
| | R15 = | 0.993 | D15 = | 0.15 | | | |
| | R16 = | 2.436 | D16 = | 0.40 | N8 = | 1.834000 | ν8 = | 37.2 |
| | R17 = | −3.761 | D17 = | Variable | | | |
| G | R18 = | ∞ | D18 = | 0.82 | N9 = | 1.516330 | ν9 = | 64.2 |
| | R19 = | ∞ | | | | | |

| | Focal Length | | |
|---|---|---|---|
| Variable Separation | 1.00 | 1.97 | 2.93 |
| D8 | 2.98 | 0.87 | 0.45 |
| D9 | 1.63 | 0.77 | 0.18 |
| D17 | 0.53 | 1.25 | 1.97 |

Numerical Example 9:

f = 1~1.93  Fno = 3.50~4.31  2ω = 53.9°~29.5°

| | | | | | | |
|---|---|---|---|---|---|---|
| R1 = | 26.066 | D1 = | 0.31 | N1 = | 1.834000 | ν1 = | 87.2 |
| R2 = | −13.666 | D2 = | 0.06 | | | |

-continued

| | | | f = 1~1.93 | | Fno = 3.50~4.31 | | 2ω = 53.9°~29.5° | | |
|---|---|---|---|---|---|---|---|---|---|
| | R3 = | 5.337 | D3 = | 0.21 | N2 = | 1.846680 | ν2 = | 23.8 | |
| | R4 = | 2.606 | D4 = | 0.24 | | | | | |
| | R5 = | 2.465 | D5 = | 0.17 | N3 = | 1.719995 | ν3 = | 50.2 | |
| | R6 = | 1.075 | D6 = | 0.66 | | | | | |
| | R7 = | 1.265 | D7 = | 0.31 | N4 = | 1.834000 | ν4 = | 37.2 | |
| | R8 = | 1.505 | D8 = | Variable | | | | | |
| | R9 = | Stop | D9 = | Variable | | | | | |
| | R10 = | 0.874 | D10 = | 1.04 | N5 = | 1.455999 | ν5 = | 90.3 | |
| | R11 = | −4.633 | D11 = | Variable | | | | | |
| G | R12 = | ∞ | D12 = | 0.64 | N6 = | 1.516330 | ν6 = | 64.2 | |
| | R13 = | ∞ | | | | | | | |

| | Focal Length | | |
|---|---|---|---|
| Variable Separation | 1.00 | 1.47 | 1.93 |
| D8 | 3.32 | 1.46 | 0.43 |
| D9 | 0.47 | 0.17 | 0.07 |
| D11 | 0.42 | 0.61 | 0.81 |

Asperic Coefficients:

| R10: | K = | −3.19280e−01 | B = | 9.51923e−03 | C = | −2.43528e−02 |
|---|---|---|---|---|---|---|
| | D = | 7.43365e−02 | E = | −1.37594e+00 | | |
| R11: | K = | 1.77845e+01 | B = | 4.24155e−01 | C = | 2.71348e−02 |
| | D = | −4.58833e−04 | E = | −2.37309e+00 | | |

It will be appreciated from the foregoing that, in the zoom lens of a type in which the lens unit of negative refractive power precedes, i.e., the negative lead type, and which comprises two lens units, proper rules of design are set forth for the form and the construction and arrangement of the constituent lenses of each of the lens units. A zoom lens whose angle of view for the wide-angle end is about 66°–54° and whose zoom ratio is about 2–3, with high optical performance maintained stable throughout the entire zooming range, while still permitting assurance of improving the compact form of the entire lens system, is thus made possible to achieve.

In particular, the number of constituent lenses is as far reduced as possible and their forms are made amenable to the low-cost production techniques even by molding. Nonetheless, the image quality is kept good and the F-number becomes fast. Even for the aspherical surfaces, the necessary number is limited to a minimum. So, the zoom lens that has a wide enough field angle and a range of 2–3 or thereabout can be produced economically.

Next, an embodiment of a photographing apparatus with the zoom lens of any one of the numerical examples 1 to 9 incorporated therein is described by reference to FIGS. 28A and 28B.

Figure 28A:
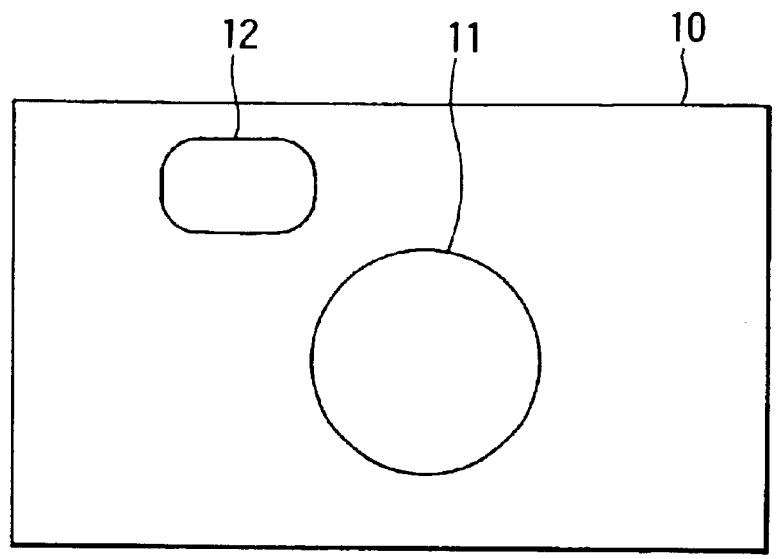
FIGS. 28A and 28B are schematic diagrams for explaining an embodiment of the photographing apparatus.
Figure 28B:
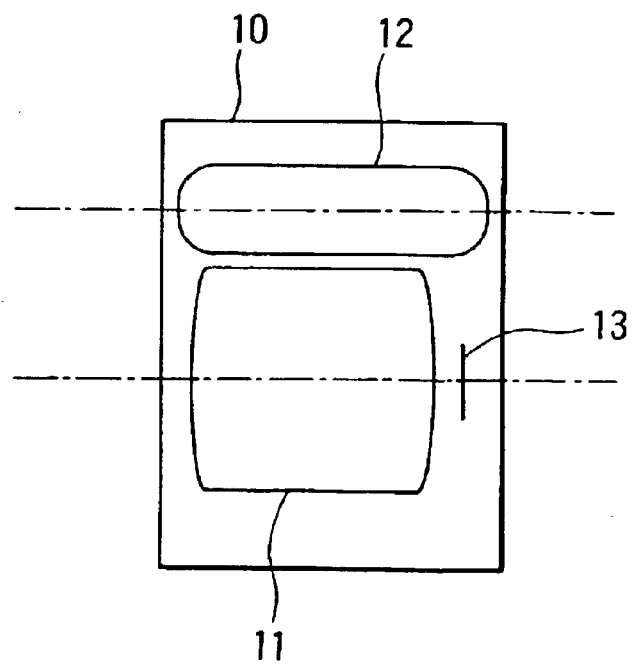

FIG. 28A is a front elevation view of the photographing apparatus and FIG. 28B is a sectional view as viewed from the right side of the same. The photographing apparatus has a body (casing) 10, a photographic optical system 11 using any one of the zoom lenses of the numerical examples 1 to 9, a finder optical system 12 and an image pickup element 13 such as CCD.

In such a manner, the zoom lens of each of the numerical examples 1–9 is applied to the photographic optical system of the photographing apparatus, thereby making it possible to realize a compact photographing apparatus.

What is claimed is:

1. A zoom lens comprising, in order from an object side to an image side,
   a first lens unit of negative refractive power, located closer to the object side than any lens units of said zoom lens, said first lens unit consisting of, in order from the object side to the image side, a positive lens element, a negative lens element, a negative lens element, and a positive lens element; and
   a second lens unit of positive refractive power, said second lens unit consisting of, in order from the object side to the image side, a positive lens element, a negative lens element, and a positive lens element,
   wherein the separation between said first lens unit and said second lens unit is varied during zooming.

2. A zoom lens according to claim 1, wherein said first lens unit consists of, in order from the object side to the image side, a positive lens element of bi-convex form, two negative lens elements of meniscus form convex toward the object side, and a positive lens element of meniscus form convex toward the object side.

3. A zoom lens according to claim 1, wherein said second lens unit has an aspherical surface closest to the object side.

4. A zoom lens comprising, in order from an object side to an image side,
   a first lens unit of negative refractive power, located closer to the object side than any lens units of said zoom lens, said first lens unit consisting of, in order from the object side to the image side, a negative lens element, a negative lens element, and a positive lens element, and
   a second lens unit of positive refractive power, said second lens unit having a positive lens element located closest to the object side and consisting of two positive lens elements and a negative lens element,
   wherein the separation between said first lens unit and said second lens unit is varied during zooming, and
   wherein the movement locus of said first lens unit during zooming from the wide-angle end to the telephoto end includes a part which is movement to the object side.

5. A zoom lens according to claim 4, wherein said first lens unit consists of, in order from the object side to the image side, two negative lens elements of meniscus form convex toward the object side and a positive lens element of meniscus form convex toward the object side.

6. A zoom lens according to claim 4, wherein said second lens unit consists of, in order from the object side to the image side, a positive lens element, a negative lens element and a positive lens element.

7. A zoom lens according to claim 4, wherein said second lens unit has an aspherical surface closest to the object side.

8. A camera comprising:

a zoom lens;

an image pickup element provided on an image plane of said zoom lens; and a parallel plate provided between said zoom lens and said image pickup element, wherein said zoom lens comprises, in order from an object side to an image side, (1) a first lens unit of negative refractive power, located closer to the object side than any lens units of the zoom lens, said first lens unit consisting of, in order from the object side to the image side, a positive lens element, a negative lens element, a negative lens element, and a positive lens element, and (2) a second lens unit of positive refractive power, said second lens unit consisting of three positive lens elements and a negative lens element, wherein the separation between said first lens unit and said second lens unit is varied during zooming.

9. A camera comprising:

a zoom lens an image pickup element provided on an image plane of said zoom lens; and a parallel plate provided between said zoom lens and said image pickup element, wherein said zoom lens comprises, in order from an object side to an image side, (1) a first lens unit of negative refractive power, located closer to the object side than any lens units of said zoom lens, said first lens unit comprising four lens elements, and (2) a second lens unit of positive refractive power, said second lens unit consisting of, in order from the object side to the image side, a positive lens element, a positive lens element, a negative lens element, and a positive lens element, wherein the separation between said first lens unit and said second lens unit is varied during zooming.

10. A camera comprising:

a zoom lens according to claim 1; and an image pickup element provided on an image plane of said zoom lens.

11. A camera comprising:

a zoom lens according to claim 4; and an image pickup element provided on an image plane of said zoom lens.

12. A zoom lens according to claim 4, further comprising an aperture stop disposed between said first lens unit and said second lens unit, wherein said aperture stop moves independently of said first lens unit and said second lens unit during zooming.

13. A zoom lens according to claim 4, wherein during zooming from the wide-angle end to the telephoto end, said first lens unit and said second lens unit move toward the object side.

14. A zoom lens according to claim 4, wherein during zooming from the wide-angle end to the telephoto end, said first lens unit and said second lens unit move toward the object side while reducing the separation between said first lens unit and said second lens unit.

15. A zoom lens according to claim 4, wherein said first lens unit moves during focusing.

16. A zoom lens according to claim 4, wherein said negative lens element of said second lens unit is a lens element of meniscus form concave toward the image side.

17. A zoom lens according to claim 9, wherein said first lens unit consists of four lens elements.

* * * * *

UNITED STATES PATENT AND TRADEMARK OFFICE
CERTIFICATE OF CORRECTION

PATENT NO. : 6,934,092 B1
DATED : August 23, 2005
INVENTOR(S) : Hiroki Nakayama

It is certified that error appears in the above-identified patent and that said Letters Patent is hereby corrected as shown below:

Title page,
Item [57], ABSTRACT,
Line 1, "includes comprises" should read -- includes --.

Column 1,
Line 67, "its" should be deleted.

Column 2,
Line 4, "Patent," should read -- patent, --.

Column 5,
Line 11, "aberrations-for" should read -- aberrations for --.

Column 6,
Line 2, "side and side." should read -- side and a positive lens of meniscus form convex toward the object side. --.

Column 7,
Line 44, "an" should be deleted.

Column 10,
Line 6, "vi" should read -- vi --.

Column 11,
Lines 13 and 46, "Asperic" should read -- Aspheric --.

Column 13,
Lines 17 and 47, "Asperic" should read -- Aspheric --.

Column 15,
Lines 20 and 52, "Asperic" should read -- Aspheric --.

Column 17,
Line 24, "Asperic" should read -- Aspheric --.

UNITED STATES PATENT AND TRADEMARK OFFICE
CERTIFICATE OF CORRECTION

PATENT NO. : 6,934,092 B1
DATED : August 23, 2005
INVENTOR(S) : Hiroki Nakayama

It is certified that error appears in the above-identified patent and that said Letters Patent is hereby corrected as shown below:

Column 19,
Line 21, "Asperic" should read -- Aspheric --.

Signed and Sealed this

Thirty-first Day of January, 2006

JON W. DUDAS
*Director of the United States Patent and Trademark Office*